United States Patent [19]
Matsuda et al.

[11] Patent Number: 6,058,249
[45] Date of Patent: May 2, 2000

[54] IMAGE FORMING APPARATUS

[75] Inventors: Yoji Matsuda; Toshiharu Takahashi; Masako Shibaki; Miki Konno, all of Kawasaki, Japan

[73] Assignee: Kabushiki Kaisha Toshiba, Kawasaki, Japan

[21] Appl. No.: 08/982,039

[22] Filed: Dec. 1, 1997

[30] Foreign Application Priority Data

Nov. 29, 1996 [JP] Japan ................................. 8-320568

[51] Int. Cl.⁷ ............................. H04N 1/32; G06F 15/00
[52] U.S. Cl. ........................ 395/113; 395/114; 395/115; 358/442; 358/468
[58] Field of Search .................................. 358/296, 401, 358/400, 402, 444, 437, 468, 434, 442; 395/112–114, 115–116; H04N 1/00, 1/32; G06F 15/00

[56] References Cited

U.S. PATENT DOCUMENTS

| | | | |
|---|---|---|---|
| 4,809,041 | 2/1989 | Funada | 355/14 |
| 4,860,115 | 8/1989 | Ogura | 358/443 |
| 4,930,016 | 5/1990 | Yazawa et al. | 358/296 |
| 4,947,345 | 8/1990 | Paradise et al. | 358/442 |
| 5,371,574 | 12/1994 | Ohmura et al. | 355/208 |
| 5,396,341 | 3/1995 | Takahashi et al. | 358/400 |
| 5,565,964 | 10/1996 | Tashiro et al. | 355/210 |
| 5,847,857 | 12/1998 | Yajima et al. | 358/468 |

FOREIGN PATENT DOCUMENTS 0 782 049   7/1997   European Pat. Off. .

*Primary Examiner*—Kim Yen Vu
*Attorney, Agent, or Firm*—Foley & Lardner

[57] ABSTRACT

An image forming apparatus having at least one of a copying function of forming an image represented by copy data, a facsimile function of forming an image represented by facsimile data, and a printing function of forming an image represented by print data, characterized by comprising means for acquiring the data, means for storing the data acquired by the data-acquiring means, means for registering image-forming commands for forming an image represented by the data stored in the storing means, means for selecting a plurality of image-forming commands registered in the command-registering means, one after another in a predetermined order, and means for forming images in accordance with the image-forming commands selected by the command-selecting means.

3 Claims, 31 Drawing Sheets

| JOBID | FRONT/ BACK | JOB TYPE | JOB STATUS | DATE/TIME | SOURCE TASK ID | COMMON PARAMETER | FAX PARAMETER | PAGE PARAMETER | ID OF MEMORY USED |
|---|---|---|---|---|---|---|---|---|---|
| 0 | NULL | NULL | NULL | NULL | NULL | NULL | NULL | NULL | NULL |
| 1 | FRONT | COPYING | BEING EXECUTED | 960902 12:11:11 | ***** | ***** | NULL | ***** | ***** |
| 2 | NULL | NULL | NULL | NULL | NULL | NULL | NULL | NULL | NULL |
| 3 | BACK | FAX PRINTING | READY FOR PRINTING | 960902 11:50:33 | ***** | ***** | ***** | ***** | ***** |
| 4 | NULL | NULL | NULL | NULL | NULL | NULL | NULL | NULL | NULL |
| 5 | NULL | NULL | NULL | NULL | NULL | NULL | NULL | NULL | NULL |
| 6 | BACK | FAX TRANSMISSION | READY FOR TRANSMISSION | 960902 11:55:55 | ***** | ***** | ***** | ***** | ***** |
| : | | | | | | | | | |
| N | NULL | NULL | NULL | NULL | NULL | NULL | NULL | NULL | NULL |

FIG. 12

| |
|---|
| TOTAL NUMBER OF TASKS |
| MAXIMUM NUMBER OF PRINT JOBS REGISTERED |
| SIZE IF JOB MANAGEMENT DATA |
| NUMBER OF PRINT JOBS REGISTERED |
| NUMBER OF THE FIRST EMPTY MANAGEMENT BLOCK |
| PRINTER STATUS |
| OPTION STATUS |
| COUNT OF THE INTERRUPTION COUNTER |

⎱ 301

| |
|---|
| PRINTER PRIORITY |
| TOTAL NUMBER OF PRINT JOBS |
| NUMBER OF THE FIRST PRINT MANAGEMENT BLOCK |
| NUMBER OF THE LAST PRINT MANAGEMENT BLOCK |
| COUNT OF THE INTERRUPTION COUNTER IN THE APPLICATION HEADER SECTION |

⎱ 302

| |
|---|
| FAX PRIORITY |
| TOTAL NUMBER OF FAX JOBS |
| NUMBER OF THE FIRST FAX PRINT MANAGEMENT BLOCK |
| NUMBER OF THE LAST FAX PRINT MANAGEMENT BLOCK |
| COUNT OF THE INTERRUPTION COUNTER IN THE APPLICATION HEADER SECTION |

⎱ 302

| |
|---|
| JOB ID |
| REQUEST SOURCE TASK |
| FORWARD CHAIN |
| BACKWARD CHAIN |
| JOB STATUS |
| JOB TYPE |
| CAUSE OF INTERRUPTION |
| TOTAL NUMBER OF PAGES |
| NUMBER OF PAGES PRINTED |
| TIME OF JOB RECEPTION |
| |
| |
| |

(○:POSSIBLE、×:IMPOSSIBLE)

| FRONT-JOB TYPE \ STATE | STEADY | CONDITION BEING SET | JOB BEING EXECUTED | JOB INTER-RUPTED |
|---|---|---|---|---|
| COPYING | ○ | × | × | △ |
| INPUT OF FAX DOCUMENT | ○* | ○ | ○ | ○ |
| POLING-TRANSMISSION RESERVATION | ○* | ○ | ○ | ○ |
| POLING-RECEPTION RESERVATION | ○* | ○ | ○ | ○ |
| RESET/REPORT PRINTING | ○* | × | × | △ |
| INPUT VIA EXTERNAL I/F | ○ | ○ | ○ | ○ |
| FAX DIRECT TRANSMISSION | ○* | × | × | × |

FIG. 29

(○:POSSIBLE、×:IMPOSSIBLE)

| JOB BEING EXECUTED \ PRINT JOB | FAX PRINTING | PRINTING OF DATA GENERATED OUTSIDE | REST/REPORT PRINTING |
|---|---|---|---|
| MEMORY FAX TRANSMISSION | ○ | ○ | ○ |
| TELEPHONE | ○ | ○ | ○ |
| BACKGROUND PRINT JOB | × | × | × |
| FAX MEMORY-FULL PRINTING | × | × | × |
| PRINTING OF EXTERNAL DATA, INTERRUPTED DUE TO PAPER RUNNING OUT | ○*1 | × | ○*1 |
| FAX PRINTING INTERRUPTED DUE TO PAPER RUNNING OUT | × | ○*2 | ○*2 |
| PRINTING OF EXTERNAL DATA, INTERRUPTED DUE TO PAPER RUNNING OUT | ○*3 | ○*3 | × |

FIG. 30

| PRIORITY LEVEL | OPERATION |
|---|---|
| 9 | ********* |
| 8 | ********* |
| 7 | NOT USED |
| 6 | NOT USED |
| 5 | NOT USED |
| 4 | PRINTING OF DATA |
| 3 | PRINTING OF FAX DATA |
| 2 | NOT USED |
| 1 | PRINTING OF A LIST |
| 0 | ********* |

FIG. 33

| VIRTUAL PRINTER | DEFAULT PRIORITY | ACTUAL PRIORITY LEVEL |
|---|---|---|
| MEMORY-FULL PRINTING OF FAX DATA | 9 | 9 |
| ORDINARY PRINTING OF FAX DATA | 3 | 4 |
| PRINTING OF A LIST | 1 | 1 |
| PRINTING OF PRINT DATA | 4 | 4 |
| PREPARATION FOR PRINTING OF CONFIDENTIAL DATA | 0 | 0 |
| PERMISSION FOR PRINTING OF CONFIDENTIAL DATA | 8 | 8 |
| EXECUTION OF A FRONT JOB | 8 | 8 |

FIG. 34

<CHANGE PRIORITY LEVEL OF PRINT JOB>

SET PRIORITY LEVELS (1-7) FOR PRINT JOBS

|  | PRESENT PRIORITY LEVEL | NEW PRIORITY LEVEL |
|---|---|---|
| PRINTING OF FAX DATA RECEIVED | 3 → | 4 |
| PRINTING OF PRINT DATA | 4 → | 4 |
| PRINTING OF A LIST | 1 → | 1 |

[CHANGE TO RECOMMENDED LEVEL] [OK] [CANCEL]

FIG. 35

<PRINTING OF CONFIDENTIAL DATA>

INPUT THE PASSWORD (0~9, #, *)

*******_

[OK] [CANCEL]

FIG. 36

IMAGE FORMING APPARATUS

BACKGROUND OF THE INVENTION

The present invention relates to an image forming apparatus which performs a plurality of functions such as copying function, facsimile function, and printing function.

In recent years, so-called multi-function image forming apparatuses have been developed, each capable of performing various functions such as copying function, facsimile function and printing. A multi-function image forming apparatus has a scanner and a printer. The scanner serves in achieving both the copying function and the facsimile function. The printer serves to accomplish the copying function, facsimile function and printing function.

Since one scanner and one printer are used for two functions and three functions, respectively, the multi-function image forming apparatus cannot perform all functions fully and completely. If the apparatus successfully perform one function, it cannot perform the remaining functions as efficiently as is desired. This is inevitably because the functions are achieved most efficiently when the printer and the scanner are controlled in different ways.

Even while set in printer mode, the multi-function image forming apparatus does not print data unless paper sheets of the designated size are available. In other words, the apparatus does not print data on paper sheets of any size other than the designated one. If the data were printed on a sheet of a size different from the designated size, the printed sheet would not look as neat as is desired.

Assume that the multi-function image forming apparatus is set in facsimile mode and that paper sheets of the designated size have run out but paper sheets of a greater size are available in the apparatus. In this case, the apparatus prints the received data on a paper sheet of the greater size. This is because it is more important to visualize the received data than to provide a neat printed sheet.

Such print jobs as described above must be executed in different operating modes. Assume one print job is interrupted because, for example, the paper sheets of the size suitable for this print job have run out. In this case, the other print jobs cannot be executed until the cause of the interruption is eliminated and the interrupted print job is completed.

BRIEF SUMMARY OF THE INVENTION

The object of the present invention is to provide an image forming apparatus which can perform print jobs with high efficiency in different operating modes.

According to the present invention, there is provided an image forming apparatus having at least one of a copying function of forming an image represented by copy data, a facsimile function of forming an image represented by facsimile data, and a printing function of forming an image represented by print data, characterized by comprising: means for acquiring the data; means for storing the data acquired by the data-acquiring means; means for registering image-forming commands for forming an image represented by the data stored in the storing means; means for selecting a plurality of image-forming commands registered in the command-registering means, one after another in a predetermined order; and means for forming images in accordance with the image-forming commands selected by the command-selecting means.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 12 shows an example of a job management table which is used in the image forming apparatus;

FIG. 14 shows another example of a print Que table which may be used in the image forming apparatus;

FIG. 29 is a table for explaining how to determine whether a front print job can be executed or not;

FIG. 30 are tables for explaining how to determine whether a backward print job can be executed or not;

FIGS. 33 and 34 are table showing the priorities assigned to print Que tables;

FIG. 35 shows a priority-changing menu displayed on the display screen;

FIG. 36 shows a password-input menu displayed on the screen; and

DETAILED DESCRIPTION OF THE INVENTION

An embodiment of the present invention will be described, with reference to the accompanying drawings.

Figure 1:
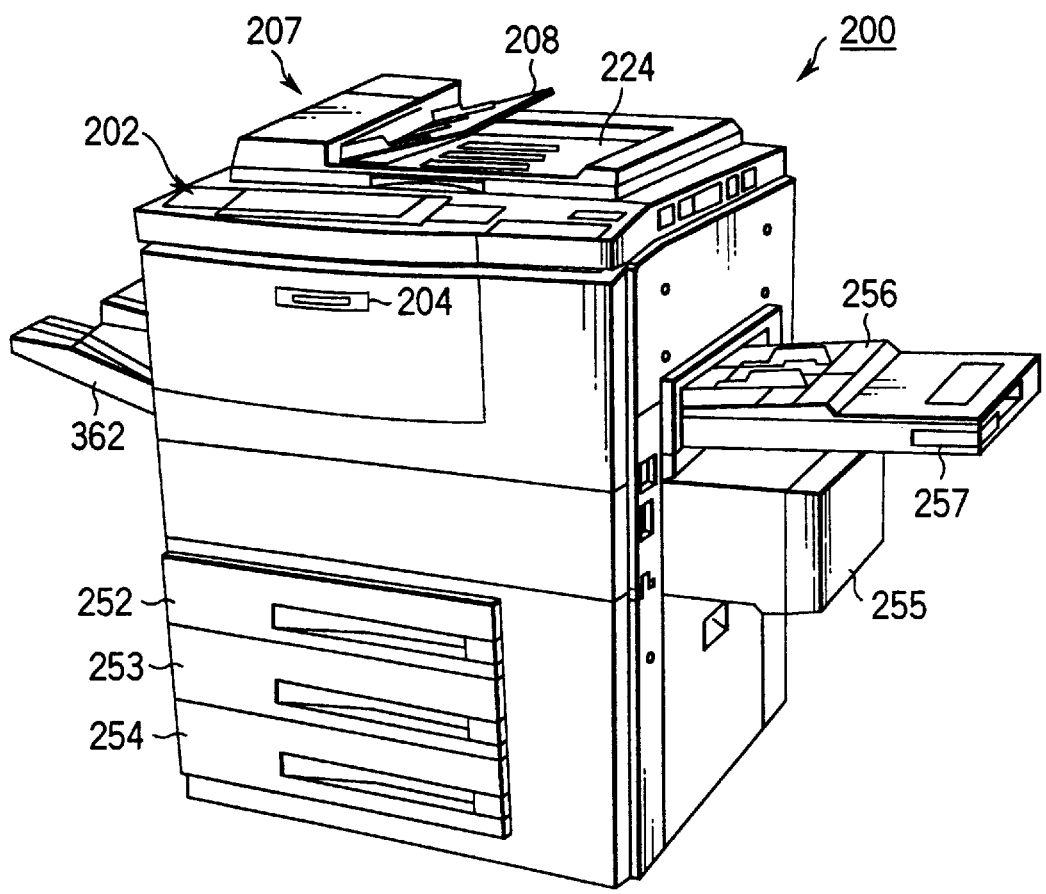
FIG. 1 is a perspective view of an image forming apparatus according to an embodiment of the present invention.
Figure 2:
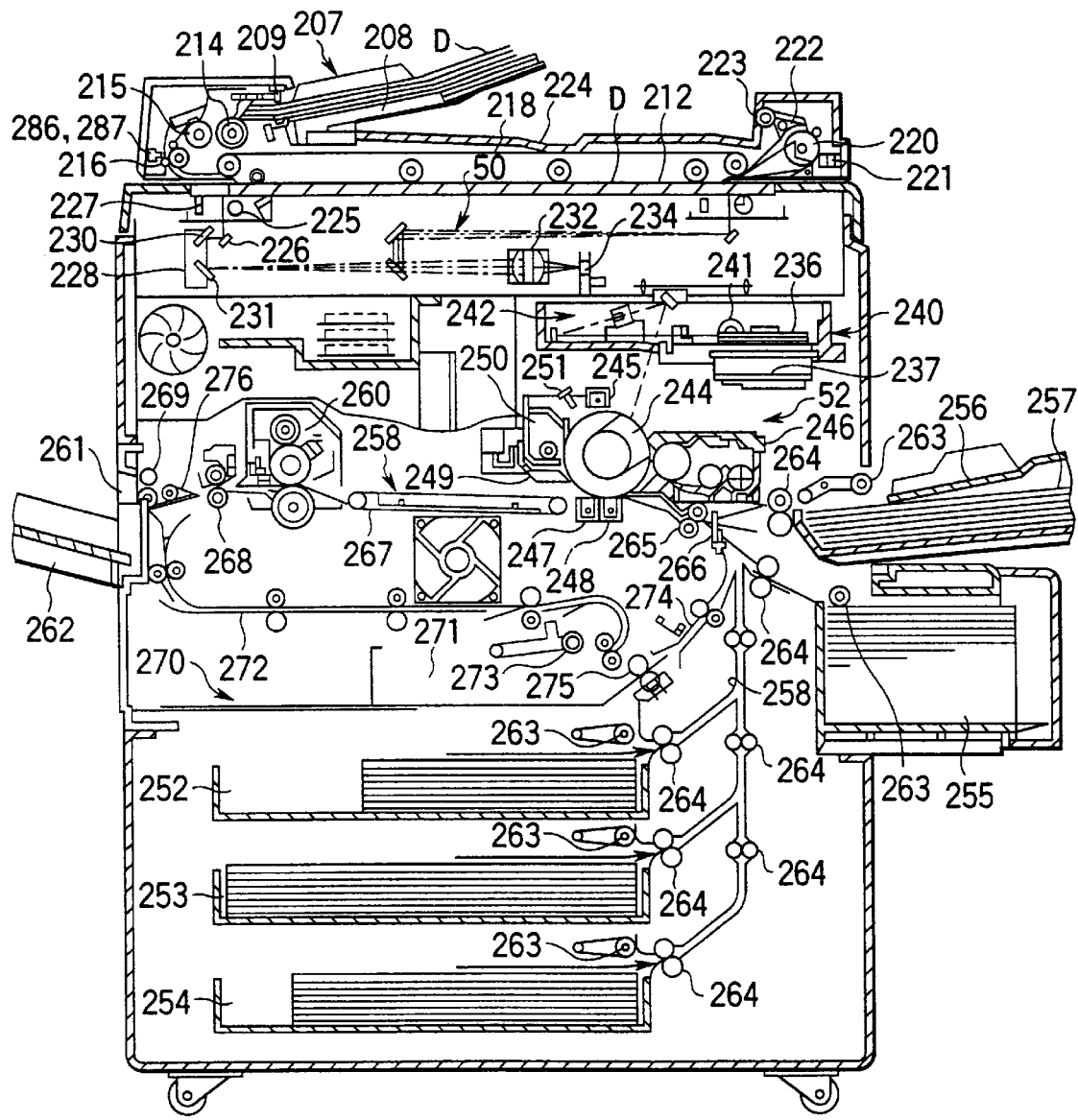
FIG. 2 is a sectional side view showing the internal structure of the image forming apparatus.

FIG. 1 is a perspective view showing the image forming apparatus. FIG. 2 is a sectional view showing the internal structure of the image forming apparatus.

As shown in FIGS. 1 and 2, an automatic document feeder (to be abbreviated as an ADF hereinafter) 207 is arranged on an image forming apparatus 200. The ADF 207 can be rotated between an opened position and a closed position. The ADF 207 feeds sheet-like documents one by one to a platen 212. The ADF 207 also serves as a document cover that presses a document placed on the platen 212.

A control panel 202 is arranged on the front portion of the upper surface of the image forming apparatus 200. The control panel 202 has a plurality of operation keys and a display with a touch panel. The operation keys are pushed to input copying conditions and copying start instruction. The display displays various kinds of information and serves to input copying conditions.

A paper cassette 257 and a large-capacity paper cassette 255 are removably inserted in the right side portion of the image forming apparatus 200. The cassette 257 can store paper sheets in small quantities. The cassette 257 has a manual insertion tray 256 for manually feeding a paper sheet. The large-capacity paper cassette 255 can store paper sheets in large quantities, e.g., about 3,000 sheets. That is, the cassette 255 stores copy paper sheets of the size most frequently used.

Paper cassettes 252, 253, and 254 are removably arranged in the lower portion of the image forming apparatus 200. These paper cassettes 252, 253, and 254 store paper sheets of predetermined sizes in the landscape and portrait directions. These paper cassettes 252, 253, and 254 are selectively used as needed. Furthermore, the paper cassettes 252 and 253 store paper sheets of the same size, but in the landscape and portrait directions.

A paper tray 363 for receiving paper sheets on which images have been formed is arranged on the left side of the image forming apparatus 200.

A disk slot 204 is formed below the control panel 202 of the image forming apparatus 200. A magnetooptical disk is inserted through the slot 204 into a magnetooptical disk device (not shown) provided in the image forming apparatus 200. The magnetooptical disk device stores image data on the magnetooptical disk or reproduces image data recorded on the magnetooptical disk.

A parallel port, serial port, small computer system interface (SCSI), and the like are arranged on the back surface of the image forming apparatus 200. The parallel port connects this apparatus and an external apparatus such as a personal computer when the image forming apparatus 200 operates as a printer. The serial port connects this apparatus and an external apparatus such as a personal computer to read out internal information of the apparatus and to set the functions of the apparatus upon maintenance of the apparatus. The SCSI makes command/data communications between this apparatus and an external controller.

The internal arrangement of the image forming apparatus will be described below with reference to FIG. 2.

The image forming apparatus 200 has a scanner unit 50 as an acquisition means for acquiring image data, and a printer unit 52 as an image forming means.

The platen 212 consisting of transparent glass on which the object to be read, i.e., a document D, is placed, and the ADF 207 for automatically feeding the document D onto the platen 212 are arranged on the upper surface of the image forming apparatus 200. The ADF 207 is free to open/close with respect to the platen 212, and also serves as a document pressing plate for bringing the document D placed on the platen 212 into tight contact with the platen 212.

The ADF 207 comprises a document tray 208, an empty sensor 209, a pickup roller 214, a paper feed roller 215, a pair of aligning rollers 216, an aligning sensor 286, a size sensor 287, and a conveyor belt 218. The document tray 208 places documents D thereon. The empty sensor 209 detects the presence/absence of documents D placed on the document tray 208. The pickup roller 214 picks up the documents D set on the document tray 208 one by one. The paper feed roller 215 feeds the document D picked up by the pickup roller 214 toward the platen 212. The pair of aligning rollers 216 align the leading end of the document D. The aligning sensor 286 is located on the upstream side of the pair of aligning rollers 216 and detects the arrival of the document D. The size sensor 287 detects the paper size of the document D. The conveyor belt 218 conveys the document D to a predetermined position on the platen 212.

On the end portion opposite to the pair of aligning rollers 216 to sandwich the conveyor belt 218 therebetween, a reversing roller 220, a non-reversing sensor 221, a flapper 222, and a discharge roller 223 are arranged. A document D, the image of which has been read, is fed from the surface of the platen 212 by the conveyor belt 218, and is discharged onto a document discharge portion 224 of the ADF 207 via the reversing roller 220, flapper 222, and discharge roller 223.

The above description is processing for reading the first surface (front) of the document D. When the second surface (back) of the document D is to be read after its first surface, the flapper 222 is switched, and the document D conveyed by the conveyor belt 218 is reversed by the reversing roller 220. The reversed document is then fed to the predetermined position on the platen 212 again by the conveyor belt 218.

The ADF 207 also comprises a paper feed motor and convey motor (neither shown). The paper feed motor drives the pickup roller 214, paper feed roller 215, and the pair of aligning rollers 216. The convey motor drives the conveyor belt 218, reversing roller 220, and discharge roller 223.

The scanner unit 50 arranged inside the image forming apparatus 200 comprises a light source 225 and a first mirror 226. The light source 225 comprises a fluorescent lamp or the like for irradiating light onto the document D placed on the platen 212. The first mirror 226 deflects light reflected by the document D in a predetermined direction. The light source 225 and the first mirror 226 are attached to a first carriage 227 arranged below the platen 212. The first carriage 227 is movable in a direction parallel to the platen 212. The first carriage 227 is reciprocally moved below the platen 212 by a driving motor via a toothed belt and the like (not shown).

A second carriage 228 is arranged below the platen 212, and is movable in a direction parallel to the platen 212. Second and third mirrors 230 and 231 are attached to the second carriage 228 at right angles. The second and third mirrors 230 and 231 deflect, in turn, the light reflected by the document D and deflected by the first mirror 226. The second carriage 228 is driven with respect to the first carriage 227 by the toothed belt and the like for driving the first carriage 227, and is translated along the platen 212 at half the speed the first carriage is moved.

An imaging lens 232 and a CCD sensor 234 are arranged below the platen 212. The imaging lens 232 focuses the light reflected by the third mirror 231. The CCD sensor 234 receives the reflected light focused by the imaging lens 232, and converts it into an electrical signal. The imaging lens 232 can be moved in a plane including the optical axis of the light deflected by the third mirror 231, by means of a driving mechanism. Upon movement of the imaging lens 232, the reflected light coming from the third mirror can be imaged at a desired magnification.

On the other hand, the printer unit 52 comprises a laser exposure device 240. The device 240 is fixed to and supported by a support frame of the image forming apparatus 200. The laser exposure device 240 comprises a semiconductor laser 241, a polygonal mirror 236, a polygon motor 237, and an optical system 242. The semiconductor laser 242 is ON/OFF-controlled in accordance with image information on the document D read by the scanner unit 50. That is, the laser 242 emits a laser beam corresponding to the image information on the document D read by the scanner unit 50. The polygonal mirror 236 continuously deflects the laser beam emitted by the semiconductor laser 241. The polygon motor 237 rotates the polygonal mirror 236 at a predetermined rotational speed. The optical system 242 deflects the laser beam deflected by the polygonal mirror 236 and guides it toward a photosensitive drum 244. That is, a laser beam emitted by the laser 242 is directed toward the drum 244 via the polygonal mirror 236 and the optical system 244. When the laser beam scans the circumferential surface of the photosensitive drum 244, an electrostatic latent image is formed on the circumferential surface of the photosensitive drum 244.

Around the photosensitive drum 244, a charger 245, a developer 246, a peeling charger 247, a peeling pawl 249, a cleaning device 250, and a charge remover 251 are arranged in turn. The charger 245 applies a predetermined charge to the circumferential surface of the drum 244. The developer 246 supplies toner (i.e. developing agent) to the surface of the drum 244, developing the latent image formed on the circumferential surface of the drum 244. That is, the developer 246 forms a toner image on the circumferential surface of the photosensitive drum 244. The peeling charger 247 separates an image forming medium, i.e., a paper sheet from the drum 244. The transfer charger 248 transfers the toner image from the drum 244 onto a paper sheet P. The peeling pawl 249 peels the copy paper sheet from the circumferential surface of the drum 244. The cleaning device 250 removes any residual toner from the circumferential surface of the drum 244. The charger remover 251 removes any residual charge from the circumferential surface of the photosensitive drum 244.

In the image forming apparatus 200, a convey path 258 extends from paper feed cassettes 252, 253, 254, and 257, and a large-capacity paper feed cassette 255 via a transfer portion provided between the photosensitive drum 244 and the transfer charger 248. A fixing device 260 is located at the end of the convey path 258.

Pickup rollers 263 each for picking up copy paper sheets one by one from the corresponding cassette are arranged in the vicinity of the paper cassettes 252, 253, 254, and 257, and the large-capacity paper cassette 255. Also, a large number of pairs of paper feed rollers 264 and a pair of registration rollers 265 are arranged along the convey path 258. The paper feed rollers 264 convey a copy paper sheet P picked up by one pickup roller 263 along the convey path 258. The registration rollers 265 correct any skew of the copy paper sheet P, adjust the leading end of the copy paper sheet P to match with that of the toner image on the photosensitive drum 244, and feed the copy paper sheet P to the transfer portion at the same speed as the moving speed of the circumferential surface of the drum. An aligning sensor 266 for detecting the arrival of the copy paper sheet P is arranged on the downstream side of the pair of registration rollers 265, i.e., on the side of the paper feed rollers 264.

A copy paper sheet P picked up one by one from a given cassette by the corresponding pickup roller 263 is fed to the pair of registration rollers 265 by the pair of paper feed rollers 264. The leading end of the copy paper sheet P is registered by the pair of registration rollers 265. Thereafter, the sheet P is fed to the transfer portion.

In the transfer portion, the transfer charger 248 transfers the toner image from the photosensitive drum 244 onto the paper sheet P. The peeling charger 247 and the peeling pawl 249 peel the paper sheet P with the toner image transferred to it, from the circumferential surface of the photosensitive drum 244. The sheet P is conveyed to the fixing device 260 by a conveyor belt 267 that partially defines the convey path 252. Thereafter, the paper sheet is discharged onto a discharge tray 362 via the discharge port 261 by a pair of paper feed rollers 268 and a pair of discharge rollers 269.

An automatic double-siding device (ADD) 270 is arranged below the convey path 258. The ADD reverses the copy paper sheet P that has passed the fixing device 60, and feeds it to the pair of registration rollers 265 again. The ADD 270 comprises a temporary stacker 271, a reversing path 272, a pickup roller 273, a convey path 274, and a paper feed roller 275. The temporary stacker 271 temporarily stacks copy paper sheets P that have passed the fixing device 260. The reversing path 272 branches from the convey path 258. The path 272 reverses the copy paper sheet P that has passed the fixing device 260 and guides it to the temporary stacker 271. The pickup roller 273 picks up copy paper sheets P stacked on the temporary stacker 271 one by one. The paper feed roller 275 feeds the copy paper sheet P picked up by the pickup roller 273 to the pair of registration rollers 265 via the convey path 274. A selector gate 276 is arranged at the branching portion between the convey path 258 and the reversing path 272. The selector gate 276 guides the copy paper sheet P to the discharge port 261 or the reversing path 272.

In a double-sided copying mode, a copy paper sheet P that has passed the fixing device 260, i.e., a copy paper sheet P on which an image has been formed on its first (obverse) side (front surface), is guided to the reversing path 272 by the selector gate 276. The copy paper sheet P guided to the reversing path 272 is temporarily stacked on the temporary stacker 271 after being reversed. Then, the copy paper sheet P is fed to the pair of registration rollers 265 via the convey path 274 by the pickup roller 273 and paper feed roller 275. The copy paper sheet P is registered by the pair of registration rollers 265, and is then fed to the transfer portion. At this time, a toner image is transferred onto the second (reverse) side of the copy paper sheet P. Thereafter, the copy paper sheet P is discharged onto the discharge tray 362 via the convey path 258, fixing device 260, and discharge roller 269.

The control system of the image forming apparatus will be described below with the aid of FIG. 3.

Figure 3:
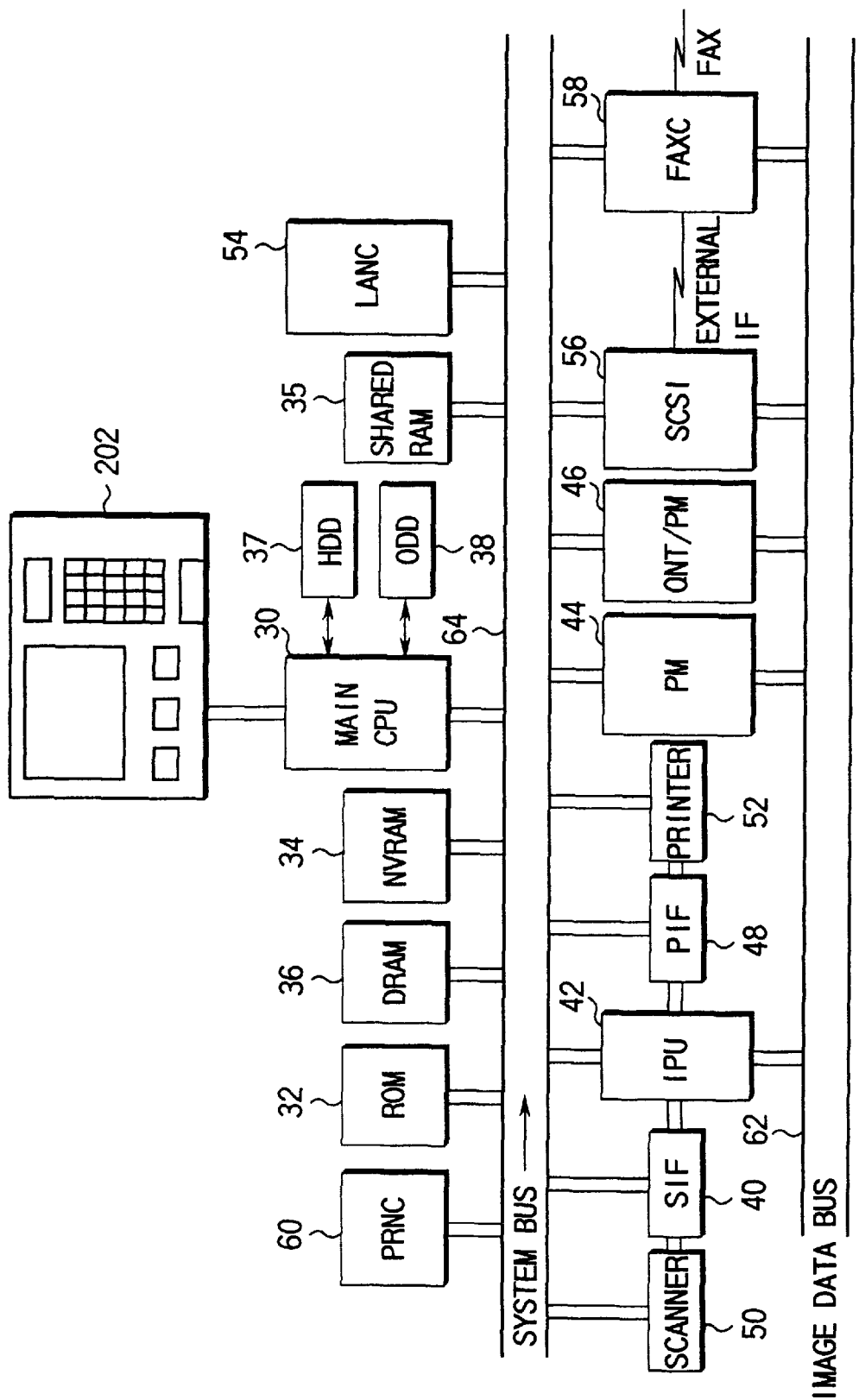
FIG. 3 is a block diagram of the control system incorporated in the image forming apparatus.

As shown in FIG. 3, the image forming apparatus comprises a main CPU 30, a ROM 32, an NVRAM 34, a shared RAM 35, a DRAM 36, a hard disk drive (HDD) 37, an optical disk drive (ODD) 38, and the control panel 202. The main CPU 30 controls the overall image forming apparatus 200. The main CPU 30 can also acquire an instruction of executing the image forming (i.e., an print job) from a print Que table (i.e., a virtual printer) in accordance with prescribed conditions. (The print Que table will be described later.) The hard disk drive (HDD) 37 and the optical disk drive (ODD) 38 serve as storage means for storing image data.

The image forming apparatus 200 further comprises a scanner interface (to be abbreviated as an SIF hereinafter) 40, an image processing unit (to be abbreviated as an IPU hereinafter) 42, a page memory (to be abbreviated as a PM hereinafter) 44, a quantizer/page memory (to be abbreviated as a QNT/PM hereinafter) 46, a printer interface (to be abbreviated as a PIF hereinafter) 48, the scanner unit 50, the printer unit 52, a local area network controller (to be abbreviated as a LANC hereinafter) 54, a SCSI 56, a facsimile controller (to be abbreviated as an FAXC hereinafter) 58, a printer controller (to be abbreviated as a PRNC hereinafter) 60, an image data bus 62, and a system bus 64.

The SIF 40 receives image data supplied from the scanner unit 50. The IPU 42 executes various kinds of image processing such as image quality improvement, enlargement/reduction, pixel decimation, image inversion, and the like. The PM 44 is a multi-valued page memory that stores multi-valued level image data in units of pages. The QNT/PM 46 comprises a binary page memory, a compression/expansion circuit, and an image processing ASIC. The binary page memory converts multi-valued level image data into binary data and stores the binary data. The PIF 48 transfers image data to the printer unit 52. The LANC 54 serves as a connection interface with the Ethernet, and a network control circuit including a CPU for controlling a predetermined network protocol. One end of a cable of the LANC 54 is connected a device (not shown) such as a router/repeater or the like that builds the network.

Figure 10:
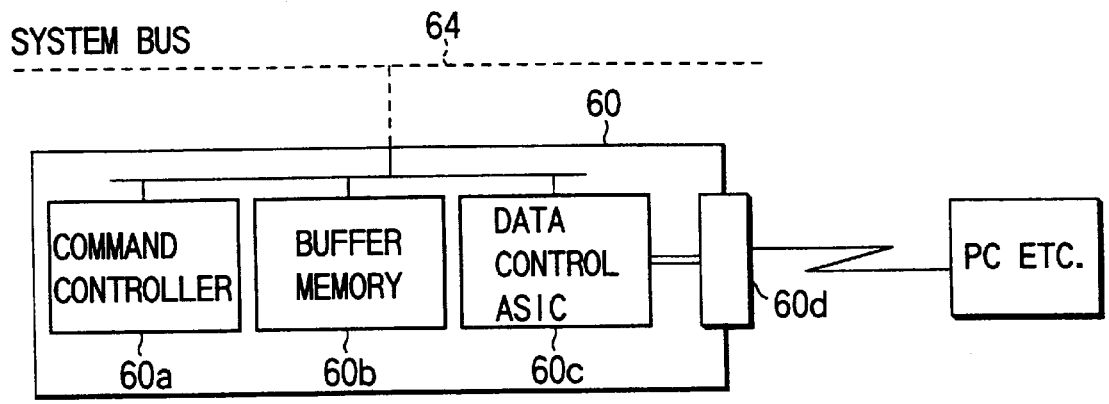
FIG. 10 is a block diagram showing the printer controller (PRNC) provided in the image forming apparatus; section incorporated in the image forming apparatus.

The SCSI 56 controls communications commands between the image forming apparatus 200 and an external apparatus such as a personal computer or the like. Upon receiving a control command supplied from the main CPU 30, the SCSI 56 interprets the received control command and sends a predetermined command to the external apparatus as a target. On the contrary, upon receiving a control command supplied from the external apparatus, the SCSI 56 transmits the received control command to the main CPU 30. The main CPU 30 interprets the control command transmitted from the SCSI 56, sends back a response to the SCSI 56, and controls the overall apparatus. The PRNC 60 performs protocol control and data transfer/compression/expansion control for receiving print data from an external apparatus such as a PC or the like. The PRNC 60 comprises a command controller 60a, buffer memory 60b, data control ASIC 60c, and parallel port 60d, as shown in FIG. 10.

The IPU 42, PM 44, QNT/PM 46, SCSI 56, and FAXC 58 are connected to each other via the image data bus 62. The SIF 40, IPU 42, PM 44, QNT/PM 46, PIF 48, scanner unit 50, printer unit 52, LANC 54, SCSI 56, FAXC 58, and PRNC 60 are connected to each other via the system bus 64.

The QNT/PM 46 and the FAXC 58 will be described below with reference to FIG. 4.

Figure 4:
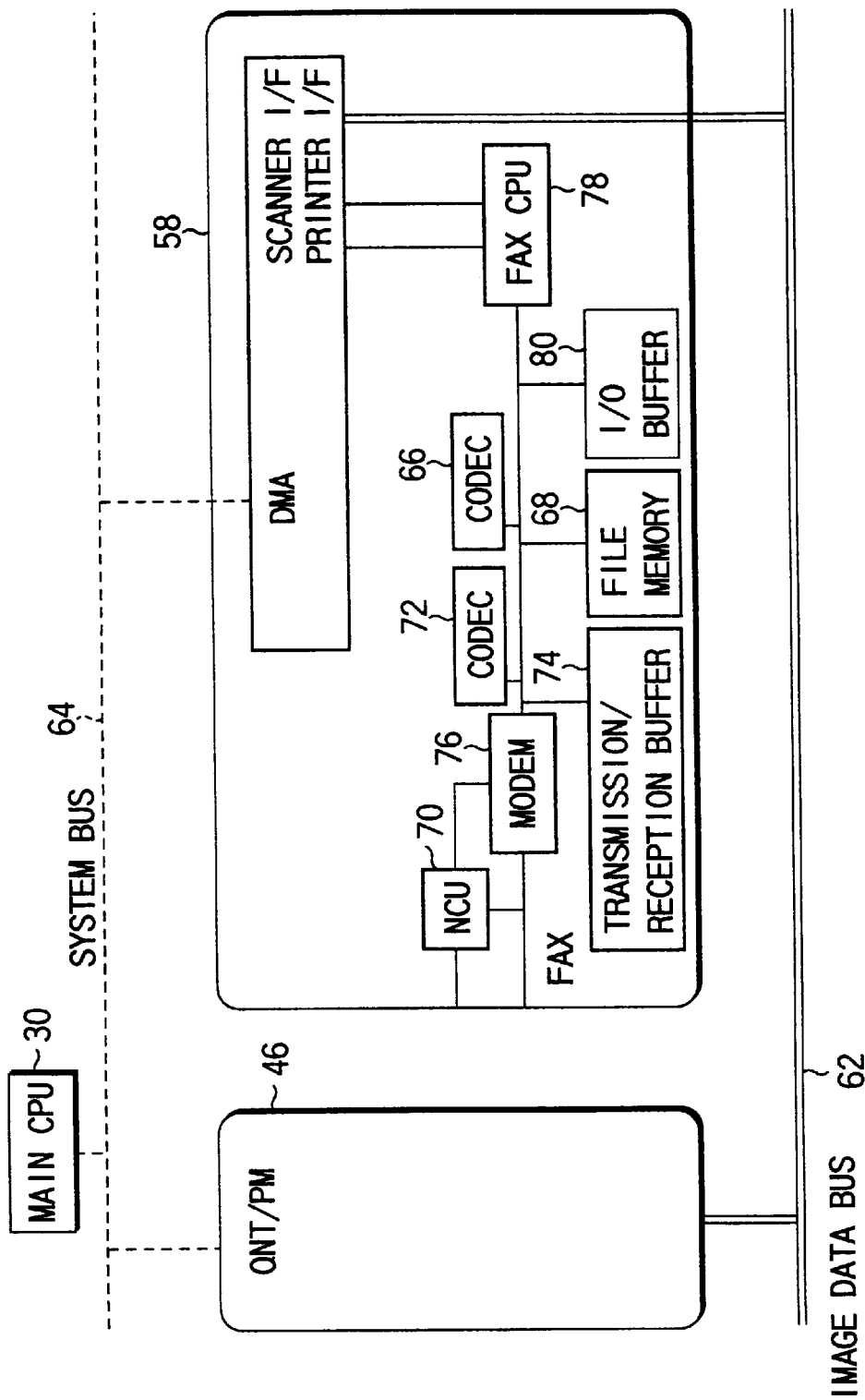
FIG. 4 is a schematic view of the facsimile section incorporated in the apparatus.

As shown in FIG. 4, the FAXC 58 that implements the facsimile function comprises a file memory 68, transmission/reception buffer 74, modem 76, coder/decoder (to be abbreviated as a CODEC hereinafter) 66, network control unit (to be abbreviated as an NCU hereinafter) 70, coder/decoder (to be abbreviated as a CODEC hereinafter) 72, FAX CPU 78, and I/O buffer 80.

The file memory 68 stores a file consisting of a plurality of image data. The transmission/reception buffer 74 connects the image forming apparatus 200 to a public network. The CODECs 66 and 72 execute coding, decoding, resolution conversion, and the like of image data. The FAX CPU 78 controls the entire FAXC 58, and communicates with the main CPU 30.

The processing for transmitting image data by the facsimile function will be briefly described below. Image data for facsimile transmission is acquired by the scanner unit 50. The acquired image data is stored in the I/O buffer 80 via the image data bus 62. The stored image data is coded and compressed by the CODEC 66, and is then stored in the file memory 68. After the NCU 70 has selected a channel, the image data stored in the file memory 68 is converted by the CODEC 72 to a coding method and resolution corresponding to the performance of the station on the other end. The converted image data is externally transmitted from the modem 76 via the transmission/reception buffer 74. A facsimile transmission header is added by the CODEC 66.

A FAX communications control command is sent from the main CPU 30 to the FAXC 58 by direct memory access (to be abbreviated as DMA hereinafter) transfer. The FAX CPU 78 of the FAXC 58 executes the contents of this FAX communications control command, and transmits status data or a request to the main CPU 30 by DMA transfer. The FAX CPU 78 outputs a control signal complying with a standard protocol onto a communications channel via the modem 76 on the basis of the FAX communications control command. The main CPU 30 sends the next instruction in accordance with the contents of the status data or request.

The processing for receiving image data by the facsimile function will be briefly described below. Received data is stored in the transmission/reception buffer 74, and is subjected to error checking and the like. Thereafter, the received data is converted into a designated coding method or the like by the CODEC 66, and the converted data is stored in the file memory 68. When image data stored in the file memory 68 is stored in the HDD 37, the image data is subjected to coding conversion, resolution conversion, and the like by the CODEC 72, and thereafter, the converted data is DMA-transferred to the HDD 37.

When image data stored in the file memory 68 is printed, the stored image data is expanded by the CODEC 66. The expanded image data is mapped on the I/O buffer 80. Thereafter, the expanded image data is transmitted to the PIF 48 via the image data bus 62. When image data stored in the HDD 37 is printed, the image data is mapped on the QNT/PM 46, and the mapped image data is transmitted to the PIF 48 via the image data bus 62.

The I/O buffer 80 can rotate the image data. For example, when image data corresponding to A4 size is received, and is rotated 90°, A4-size paper sheets stored in different directions can be used. The A4-size paper sheets stored in the different directions are so-called A4 portrait and landscape paper sheets. With this rotation, documents can be input in the portrait and landscape directions.

The schematic arrangement of the control panel 202 will be described below with reference to FIG. 5.

Figure 5:
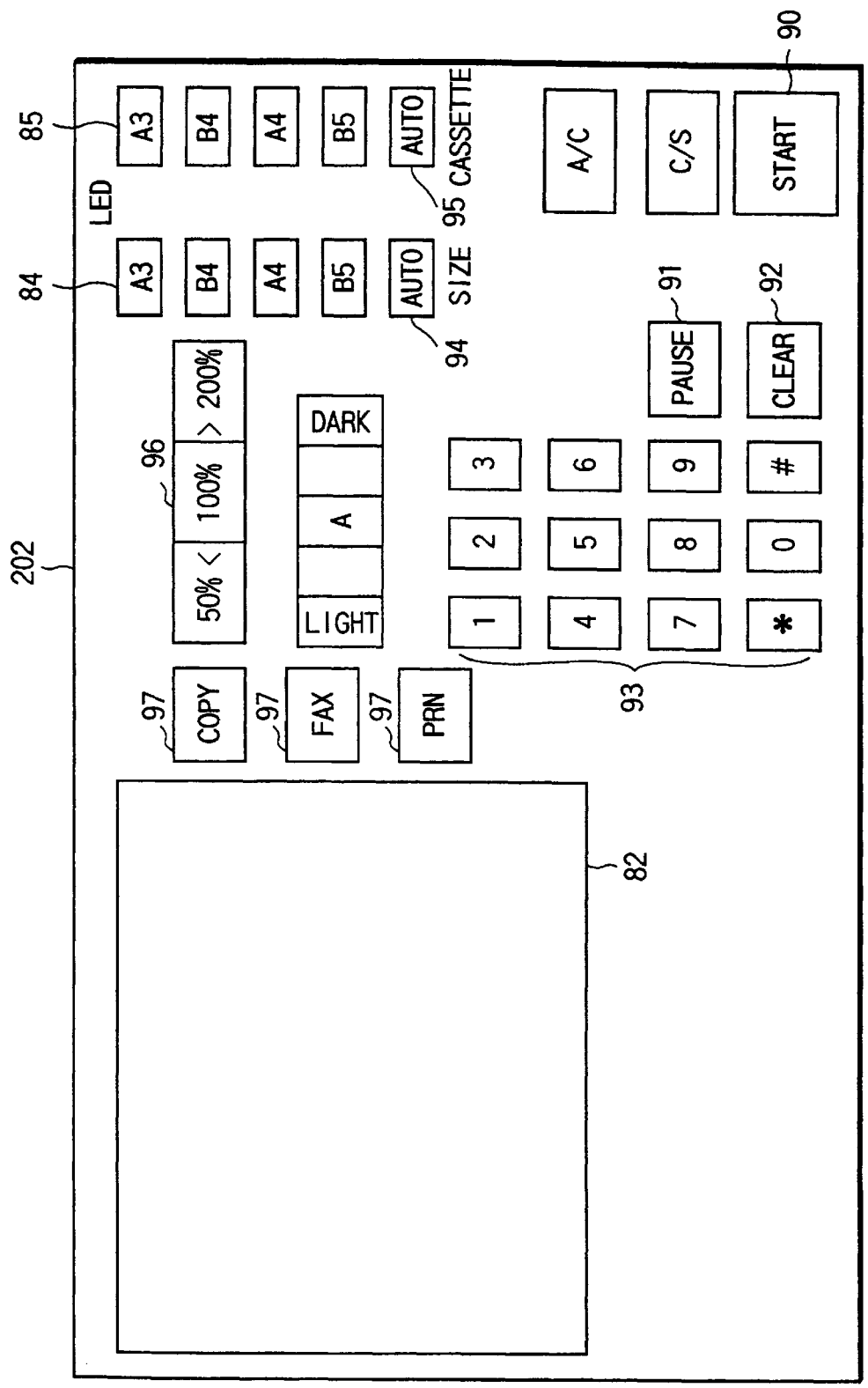
FIG. 5 shows the control panel of the image forming apparatus.

As shown in FIG. 5, the control panel 202 has a touch panel display 82, start key 90, pause key 91, clear key 92, ten-key pad 93, size key 94, cassette key 95, LEDs 84 and 85, magnification setting keys 96, and image mode selection keys 97. The ten-key pad 93 accepts inputs of the copy count and telephone number. For this reason, this ten-key pad 93 has the same layout as that of a telephone. Note that the keys 90 to 97 will be generally called hard keys hereinafter.

Figure 6:
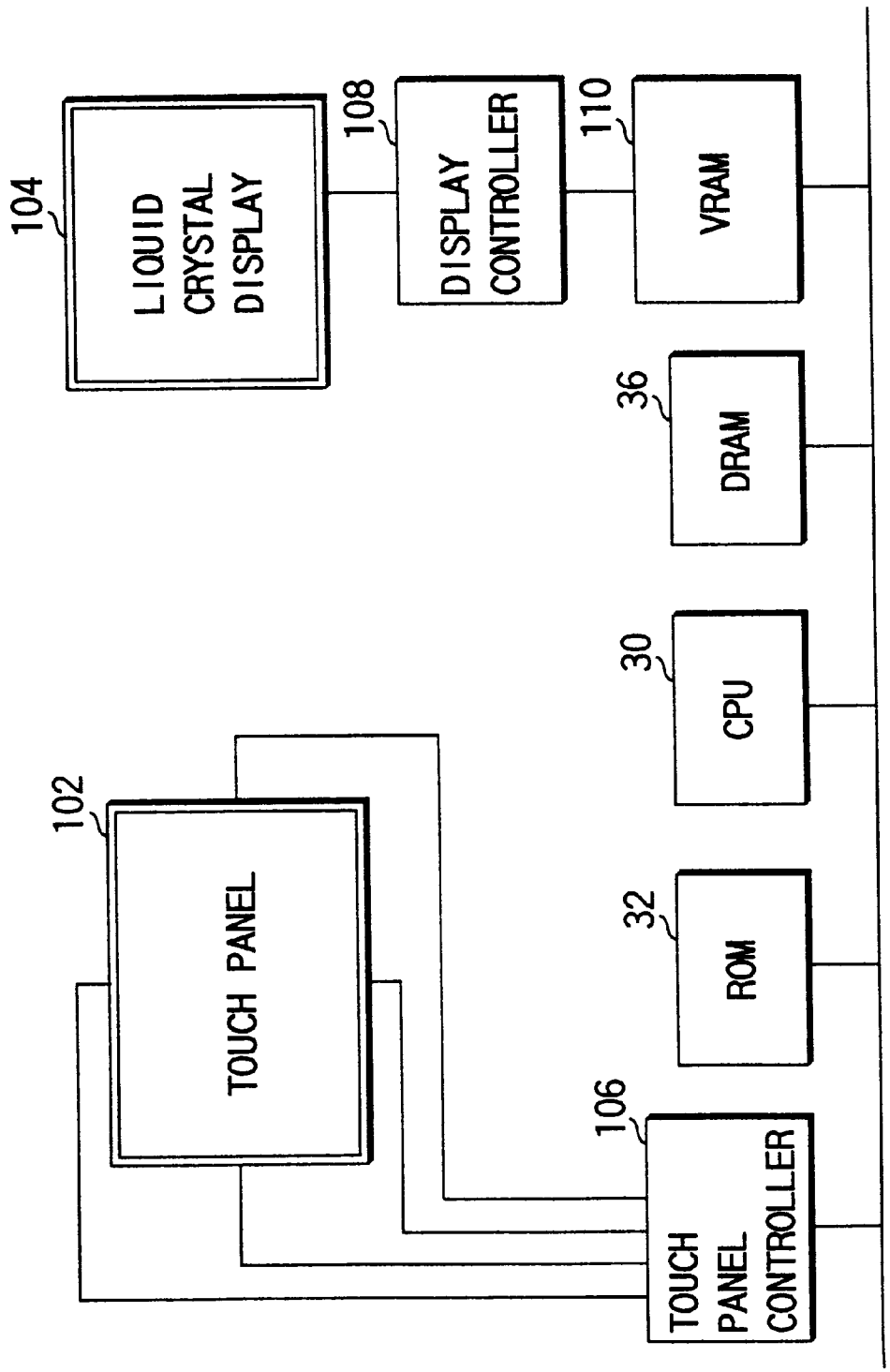
FIG. 6 is a block diagram illustrating the touch panel display provided on the control panel.

The schematic arrangement of the touch panel display 82 will be explained below with reference to FIG. 6.

The touch panel display 82 is constituted by stacking a touch panel 102 on a liquid crystal display 104. The touch panel display 82 displays information such as operation procedures by means of illustrations, characters, and the like. The touch panel display 82 also displays keys for accepting various instruction inputs. When a displayed key is pressed, the touch panel 102 detects it, and outputs a corresponding signal to a touch panel controller 106. The touch panel controller 106 analyzes a predetermined key input on the basis of the signal output from the touch panel 102. The liquid crystal display 104 is connected to a display controller 108 and a VRAM 110 for storing display data in units of display pixels.

A G3 facsimile communications protocol will be explained below with reference to FIGS. 7 to 9. The following description will exemplify a non-error correction mode, but the same basically applies to an error correction mode.

Figure 7:
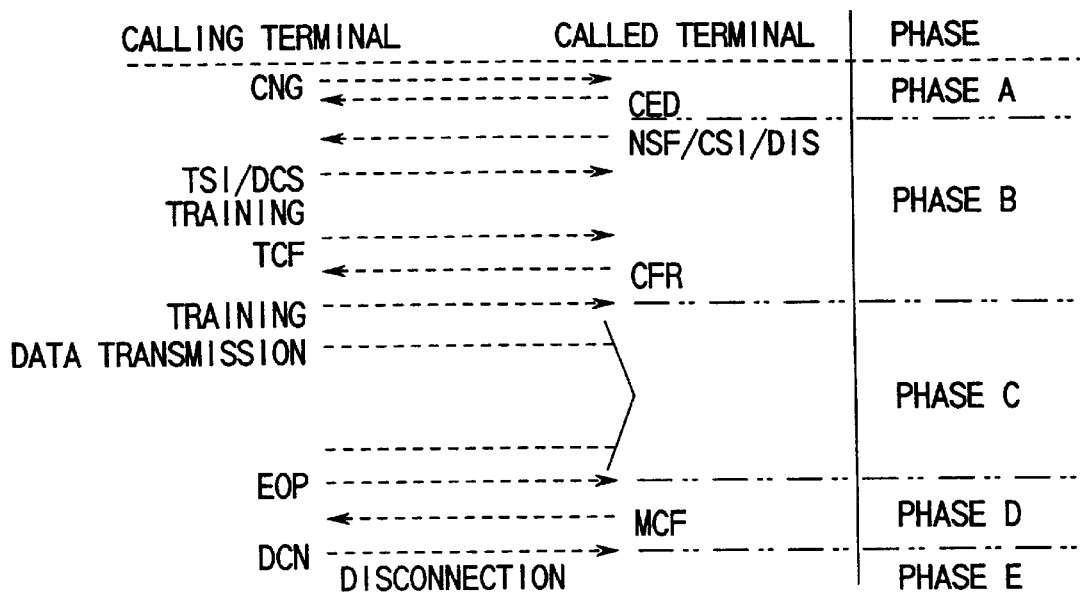
FIG. 7 is a diagram explaining G3-facsimile communications protocol used to transmit only one page of data.

FIG. 7 is a view for explaining the flow of the communications protocol upon transmitting image data corresponding to a single page (the absence of the following page). As shown in FIG. 7, the FAX communications protocol is divided into five phases A to E, i.e., phase A: call setup, phase B: initial acknowledgement, phase C: data transmission, phase D: transmitted data acknowledgement, and phase E: disconnection.

Figure 8:
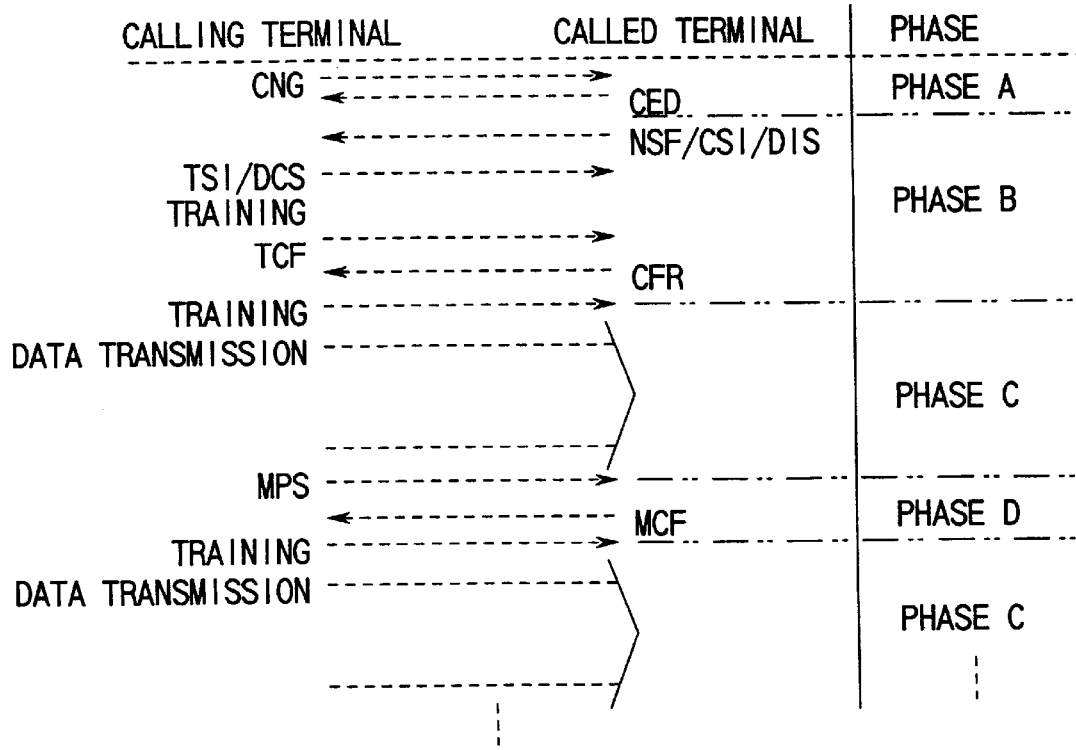
FIG. 8 is a diagram explaining G3-facsimile communications protocol used to transmit two or more pages of data in the same transmission condition.

FIG. 8 is a view for explaining the flow of the communications protocol upon transmitting image data corresponding to a plurality of pages (the presence of the following page). In case of FIG. 8, the called terminal is informed of multi-page transmission in phase D (MPS), and thereafter, phase C and the subsequent phases are repeated.

Figure 9:
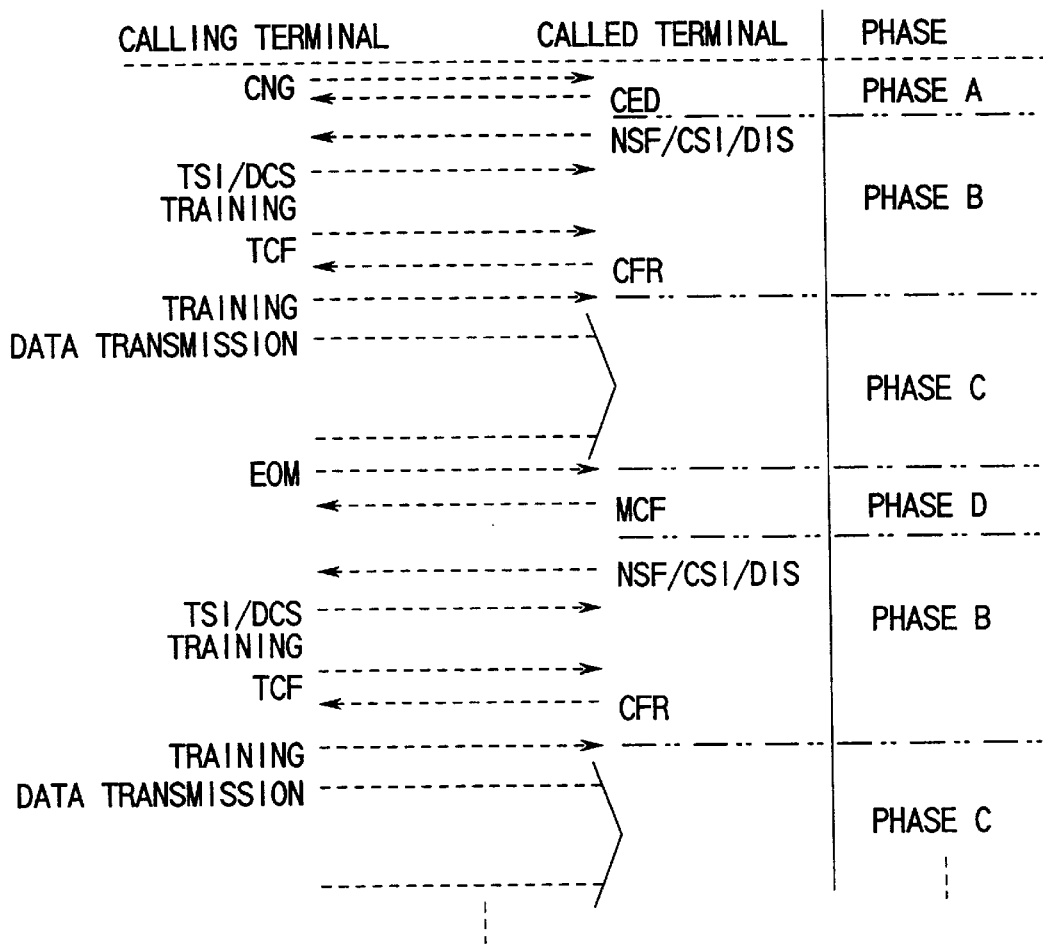
FIG. 9 is a diagram explaining G3-facsimile communications protocol used to transmit two or more pages of data in different transmission conditions.

FIG. 9 is a view for explaining the flow of the communications protocol upon transmitting image data corresponding to a plurality of pages (the presence of the following page) while changing the transmission conditions. In case of FIG. 9, the called terminal is informed of changes in communication conditions in phase D (EOM), and thereafter, phase B and the subsequent phases are repeated.

In phase B (initial acknowledgement) of each communications procedure, the called terminal (receiving terminal) initially transmits a Not standard facsimile signal. This Not standard facsimile signal presents a country code and manufacturer code.

How network communications are carried out with the image forming apparatus 200 will be described below.

To execute network communication, the user operates the control panel 202, setting the network transmission mode and inputting destination information (e.g., the network address or user ID of the destination terminal). The destination information input is set under the control of the main CPU 30. The image forming apparatus is connected to the line under the control of the FAX CPU 78. The FAX CPU 78 disconnects the apparatus from the line after all image data is transmitted to the destination terminal.

To accomplish the facsimile transmission, the menu displayed on the screen of the touch panel display 82 is switched to the facsimile menu. The user touches the display screen, selecting the facsimile transmission mode. As a result, the image forming apparatus is set in the facsimile transmission mode. Alternatively, the apparatus 200 may be set in the facsimile transmission mode by operating a terminal (e.g., a personal computer) connected to the network.

The scanner unit 50 acquires the image data to be transmitted to the destination terminal. The IPU 42 performs predetermined processing on the image data thus acquired. The image data is then developed in the I/O buffer 80, in the form of binary data. The CODEC 66 encodes and compresses the binary data developed in the I/O buffer 80. If necessary, the binary image data is processed to rotate the image it represents and to change the resolution of the image. The image data processed is stored into the file memory 68. The CODEC 72 processes the image data stored in the file memory 68, thereby changing the resolution and size of the image to those which are suitable for the destination terminal. The image data processed by the CODEC 72 is transmitted to the destination terminal through the network.

The control system incorporated in the image forming apparatus 200 will be described, with reference to FIG. 11.

Figure 11:
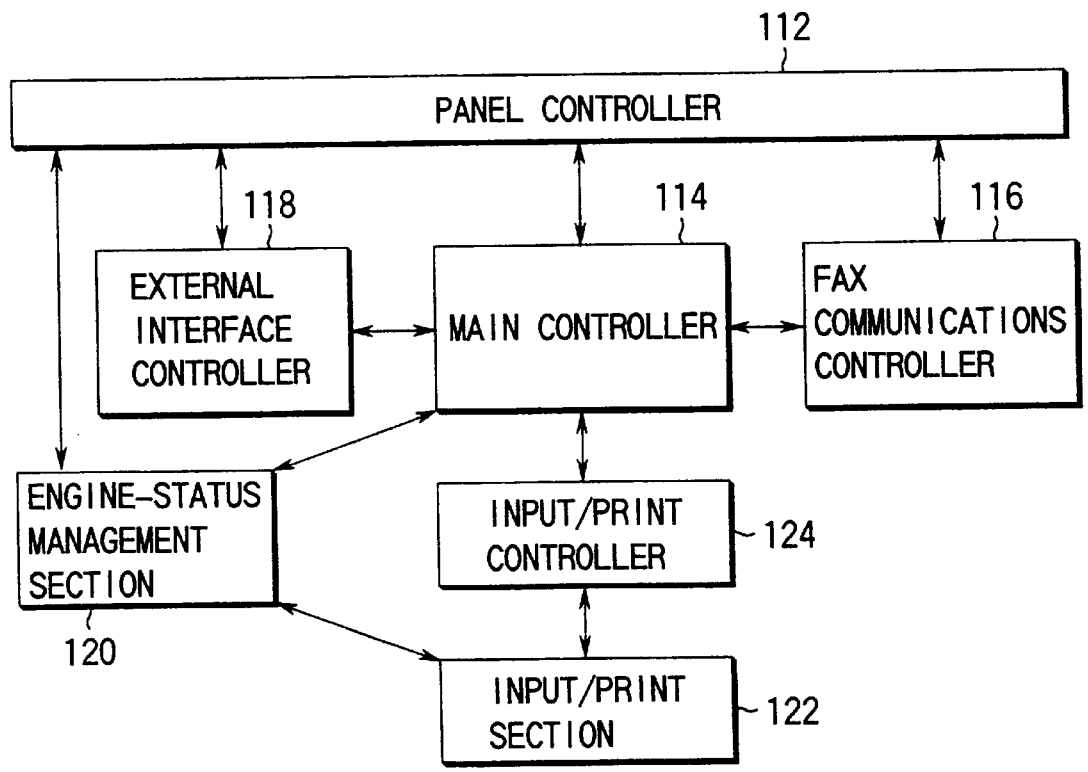
FIG. 11 is a block diagram illustrating the control system incorporated in the image forming apparatus.

As shown in FIG. 11, the control system comprises a panel controller 112, a main controller 114, a facsimile (FAX) communications controller 116, an external interface controller 118, an engine-status management section 120, an input/print section 122, and an input/print controller 124.

The panel controller 112 detects any data input by operating the hard keys on the control panel 202 and any data input by operating the touch panel 102. The controller 112 also generates a menu which the liquid crystal display 104 is to display. The input data detected by the controller 112 is supplied to the main controller 114. The main controller 114 supplies the input data to the FAX communications controller 116, external interface controller 118, and engine-status management section 120 and input/print controller 124. Conversely, items of data are supplied from the controllers 116, 118 and 124 and the section 120 to the main controller 114, which in turn supplies these data items to the panel controller 112. The panel controller 112 supplies the data items to the liquid crystal display 104, which displays the data items.

The main controller 114 controls any other component of the image forming apparatus 200. The main controller 114 activates the other components. More precisely, the controller 114 conforms the hardware configuration of the apparatus 200 and initializes the controller 116, 118, 120 and 122 when the power switch of the apparatus 200 is turned on. The main controller 114 also manages the print Que table and the execution of jobs, in accordance with a job management table illustrated in FIG. 12. When a request for the execution of a particular job is made, the controller 114 determines whether the job can be executed or not, on the basis of the hardware configuration of the apparatus 200 and the type of the job being executed.

The job management table is stored in the NVRAM 34. This table will be described, with reference to FIG. 12.

Various jobs are generated in the image forming apparatus 200. Among them are a copy job, a FAX transmission job, a FAX reception job, and a print job.

The copy job is to acquire print data by means of the scanner unit 50 and cause the printer unit 52 to print the image represented by the print data. The copy job is generated when the control panel 202 is operated, designating the copying function. Namely, the panel controller 112 generates the copy job. The copy job is supplied from the controller 112 to the main controller 114 and registered in the job management table.

The FAX transmission job is to acquire transmission data from the scanner unit 50, store this data in the PM 44, and transmit the data stored in the PM 44, at a predetermined time, by means of the FAXC 58. The FAX transmission job is generated by the panel controller 112 when the control panel 202 is operated, thus generating a FAX transmission instruction. The FAX transmission job is supplied from the controller 112 to the main controller 114 and registered in the job management table.

The FAX reception job is to acquire FAX print data by means of the FAXC 58, store the FAX print data in the PM 44, and cause the printer unit 52 to print the image represented by the FAX print data. The FAX reception job is generated by the FAX communications controller 116 when the FAXC 58 receives the FAX print data. The FAX reception job is supplied from the controller 116 to the main controller 114 and registered in the job management table.

The print job is to acquire pint data by means of the SCSI 56, store the print data in the PM 44, and cause the printer unit 52 to print the image represented by the print data stored in the PM 44. The print job is generated by the external interface controller 118 when the SCSI 56 receives the print data. The print job is supplied from the controller 118 to the main controller 114 and registered in the job management table.

The copy job, FAX transmission job, FAX reception job and print job are registered in the job management table, in the from of job IDs. The job management table includes a FRONT/BACK table, a job type table, a job status table, a date and time table, a source task ID table, a common parameter table, a FAX parameter table and the like, which store data items associated with the job IDs.

Registered in the FRONT/BACK table are a front job and a background job.

The front job is executed when the user operates the control panel 202, inputting an instruction. The front job must be executed immediately in response to the instruction. Hence, it is executed before the background job in most cases. The front job is either the copy job or the FAX transmission job.

The background job is any job other than the front job. The background job need not be executed at once. Usually it is executed after the front job. The background job is either the FAX reception job or the print job.

In the job management table, the front job and the background job are distinguished form each other. The front job is executed prior to the background job.

Registered in the common parameter table are common parameters which are used to set the scanner unit 50. Registered in the FAX parameter table are parameters indispensable to the facsimile function. In FIG. 12, the mark "*****" indicates that a particular value is set, and the word "NULL" means that no value is set.

The control system of the image forming apparatus 200 will be described further.

The FAX communications controller 116 controls the FAXC 58. Assume the user operates the control panel 202, inputting a FAX transmission instruction. The instruction is supplied to the FAX communications controller 116. Upon receipt of the instruction the controller 116 outputs a FAX transmission instruction to the main controller 114. In response to this instruction, the controller 144 acquires print data to be transmitted by means of facsimile. The print data is stored into the FAXC 58 or the HDD 37. At this time, a job of waiting for FAX transmission is registered in the job management table.

Assume the FAX communications controller 116 receives print data to be transmitted by facsimile. The print data is stored into the FAXC 58 or the HDD 37 under the control of the FAX communications controller 116. The controller 116 outputs a data-printing instruction to the main controller 114. In response to the data-printing instruction, the controller 144 causes the printer unit 52 to print the print data. Upon completion of the printing, the print data is erased in the FAXC 58 or the HDD 37.

The external interface controller 118 controls the SCSI 56. Assume the controller 118 receives print data. The print data is stored into the HDD 37 or the QNT/PM 46 under the control of the external interface controller 118. The controller 118 outputs a print instruction to the main controller 114. In response to the print instruction, the controller 114 causes the printer unit 52 to print the print data.

The engine-status management section 120 monitors the operating conditions of the scanner unit 50 and printer unit 52. Suppose the section 120 detects that the scanner unit 50 is malfunctioning. In this case, the section 120 supplies a signal indicating this fact to the main controller 114 and the input/print section 122. Further, the section 120 causes the panel controller 112 to display a message informing the user that the scanner unit 50 is malfunctioning.

The input/print section 122 comprises the IPU 42, the scanner unit 50, and printer unit 52. The IPU 42, scanner unit 50 and printer unit 52 perform their respective functions as has been described above.

The input/print controller 124 controls the inputting of data to the apparatus 200 and the operation of the printer unit 52. To receive and print FAX print data, for example, the controller 124 controls the scanner unit 50 and the printer unit 52 independently.

The print Que table will be explained, with reference to FIGS. 13 and 14.

The print Que table is registered in, for example, the NVRAM 34. This table is the means for registering image-forming instructions.

Figure 13:
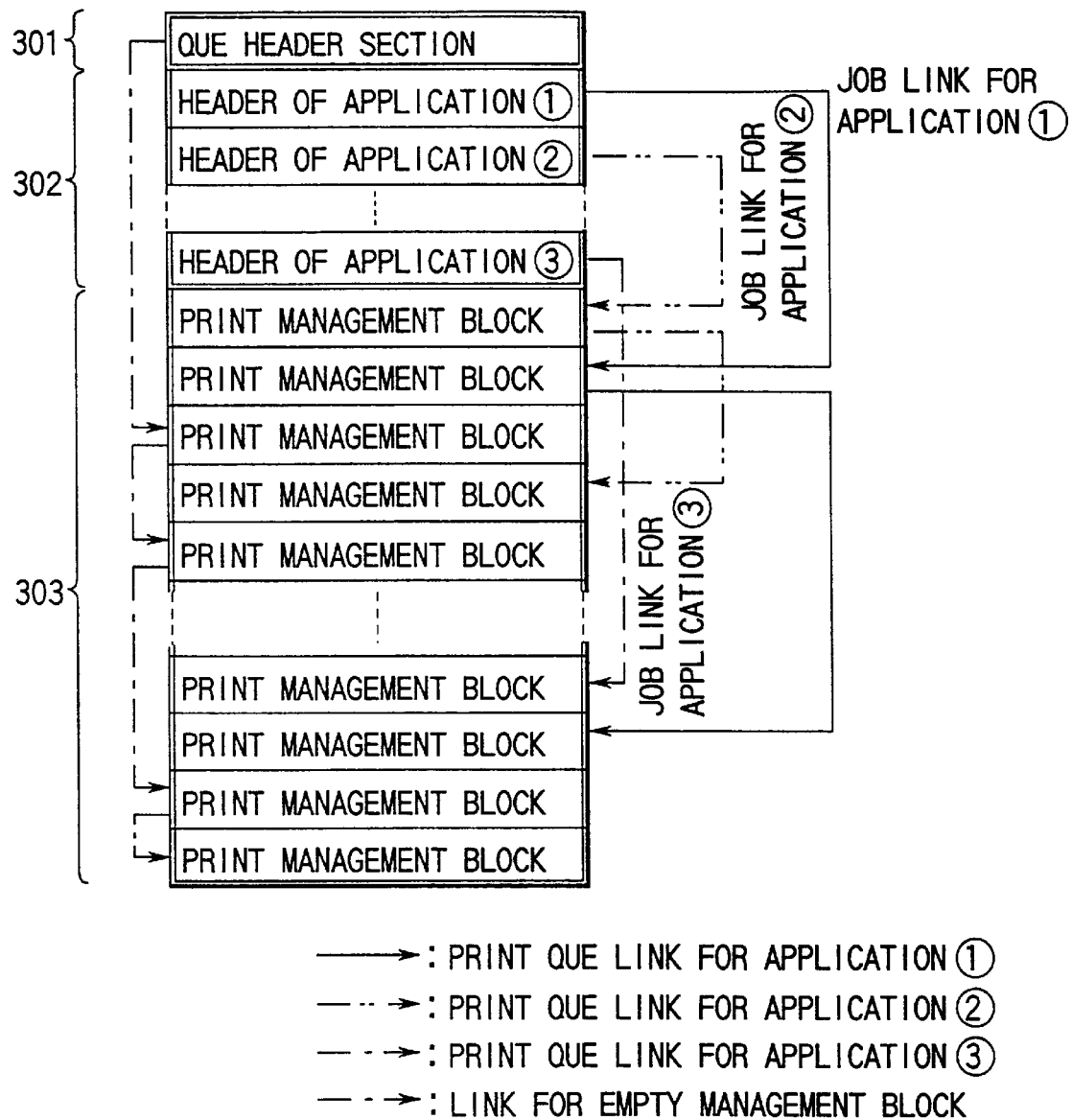
FIG. 13 shows an example of a print Que table which may be used in the image forming apparatus.

As seen from FIG. 13, the print Que table is composed of a Que header section 301, an application header section 302, and a print management block sections 303.

As shown in FIG. 14, the total number of tasks, the maximum number of jobs registered, the size of job management data, the number of jobs registered, the numbers of the first empty management block, the printer status, the option status, and the interrupted count of the counter are registered in the Que header section 301.

In the application header section 302, there are registered the printer priority, the total number of print jobs, the number of the first print management block, the number of the last print management block, the first interrupted count of the application counter, the FAX priority, the total number of FAX jobs, the number of the first FAX print management block, the number of the last FAX print management block, and the second interrupted count of the application counter.

In the print management block sections 303, there are registered the job ID, the request-source task, the forward chain, the backward chain, the job status, the job type, the cause of interruption, the total number of pages, the number of pages printed, and the time of job reception, and the like.

Figure 15:
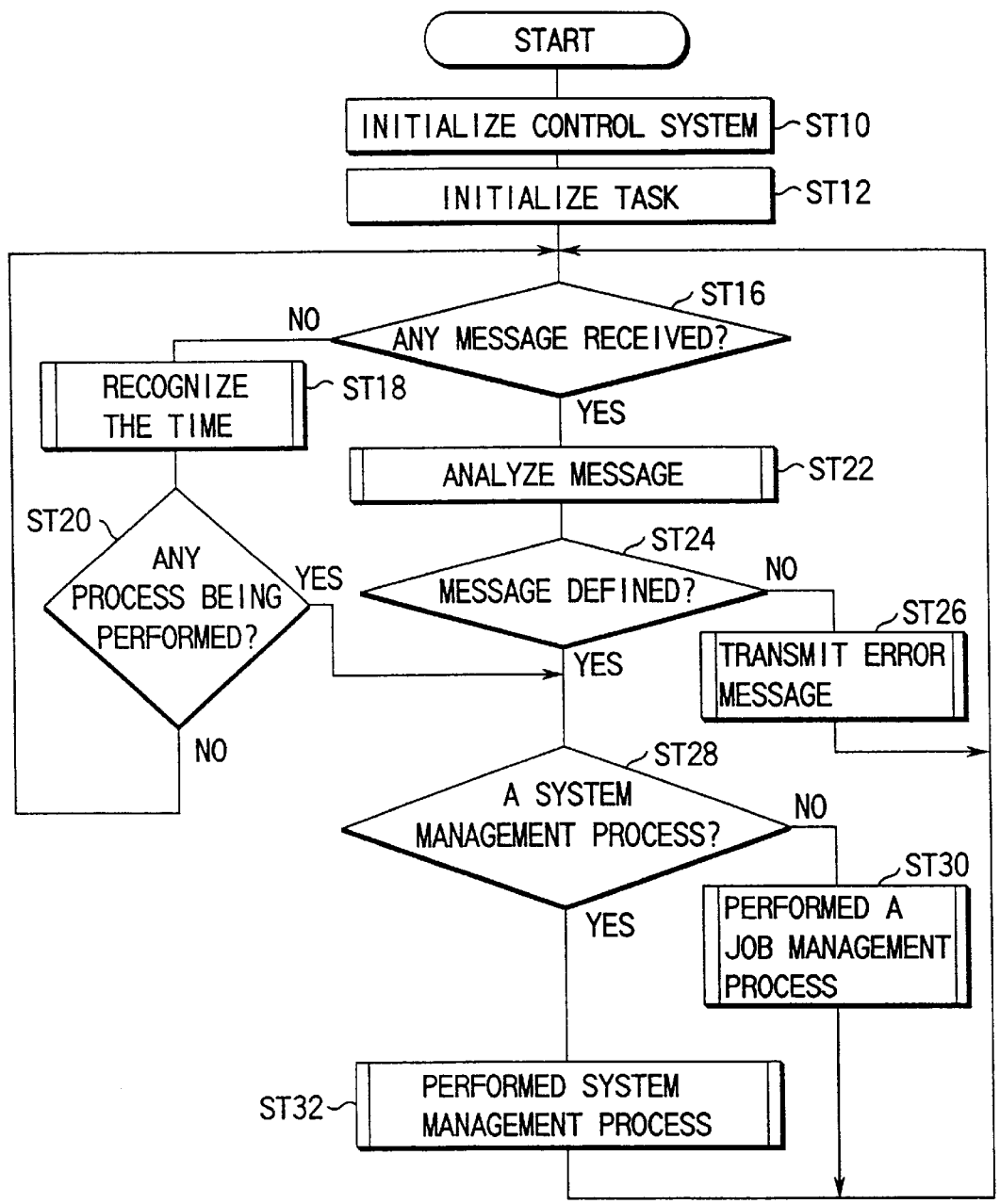
FIG. 15 is a flow chart explaining the operation of the main controller.

The operation of the main controller 114 will be described, with reference to the flow chart of FIG. 15.

First, the control system is initialized (ST10). Then, the task is initialized (ST12). It is determined whether the controller 114 has received a message or not (ST16). If NO in the step ST16, the time is recognized (ST18) as will be later described in detail. Then it is determined whether or not any process is being performed (ST20). If YES in the step ST20, the operation goes to the step ST28.

If YES in the step ST15, that is, if the controller 114 has received a message, the message is analyzed (ST22). It is determined whether or not the message analyzed has been defined or not (ST24). If YES in the step ST24, an error message is transmitted (ST26). If NO in the step ST24, it is determined from the message whether or not the process being performed is a system management process (ST28). If NO in the step ST28, that is, if the process is not a system management process, a job management process is carried out (ST30). If YES in the step ST28, the process, i.e., a system management process, is performed (ST32).

The term "system management process" means a process which is carried out when the control system receives a message concerning the activation of the control system. The term "job management process" means a process which is executed when the control system receives a message concerning the control of a job, either instructing that a job should be executed or indicating what results have been attained by executing a job.

The main controller 114 registers print jobs in the print Que table in accordance with the print instruction supplied from any other controllers, i.e., the panel controller 112, FAX transmissions controller 116, external interface controller 118, and engine-status management section 120 and input/print controller 124. The main controller 114 also periodically monitors the print job which is being executed. Further, the main controller 114 retrieves a print job from the print Que table and instructs the input/print controller 124 to cause the input/print section 122 to execute this print job. The first pint job the main controller 114 retrieves is the one having the higher priority than any other print job registered in the print Que table.

Figures 16, 17:
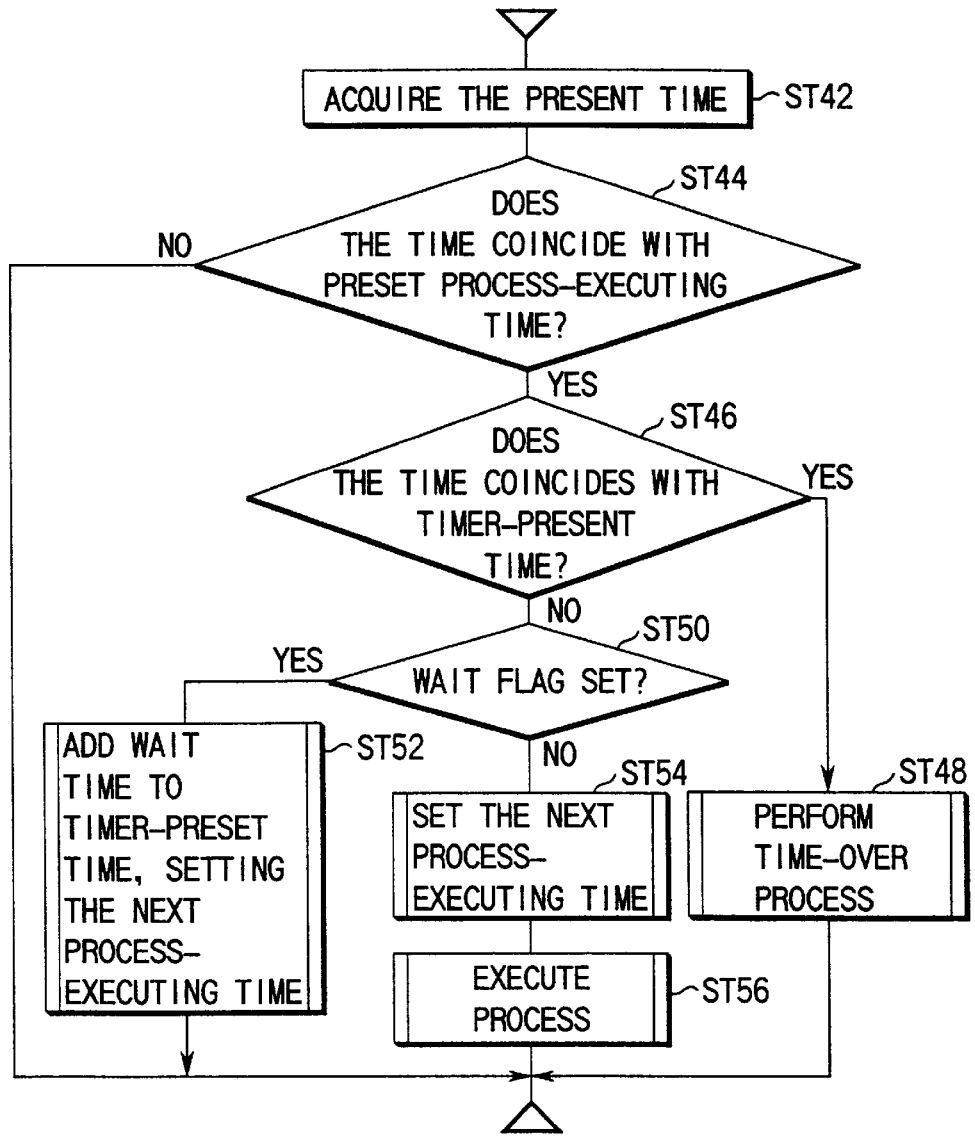
FIG. 16 is a flow chart explaining how the time is recognized.
FIG. 17 shows an example of a time management table.

The step ST18, i.e., the time-recognizing process, will be explained with reference to FIGS. 16 and 17. FIG. 16 is a flow chart, and FIG. 17 shows a time management table.

The time-recognizing process is performed to determine whether a preset time has been reached or not. If the preset time is recognized to have been reached, the image forming apparatus is set in time-saving mode.

With reference to FIG. 16, the time-recognizing process will be described in detail. First, the present time is acquired (ST42). It is determined whether or not the present time coincides with a preset time of executing a process (ST44). If YES in the step ST44, it is determined whether or not the present time coincides with a timer-preset time registered in the time management table (ST46). If YES in the step ST46, a time-over process is performed (ST48).

If YES in the step ST44 and NO in the step ST46, that is, if the present time coincides with the preset process-executing time but does no coincides with the timer-preset time, it is determined whether or not a wait flag is set (ST50). If the wait flag is set, the wait time is added to the timer-preset time, thus setting the next process-executing time (ST 52). If the wait flag is not set, the next process-executing time is set (ST54). When the next process-executing time set either in the step ST52 or in the step ST54 is reached, the process is executed (ST56).

If any process interrupted is detected, it is determined whether the wait flag registered in the time management table is set or not. If not set, the wait flag is set, thereby delaying the start of the next process. This makes it possible to execute the interrupted process.

When the process-executing time is reached, the main controller 114 acquires the print job registered in the print Que table shown in FIGS. 13 and 14. The print job acquired is supplied to the input/print controller 124. If the input/print controller 124 cannot execute the print job, the next process-executing time is set, and the operation goes to the step ST16 (FIG. 15). In the step ST15 it is determined whether the controller 114 has received a message or not.

Figure 18:
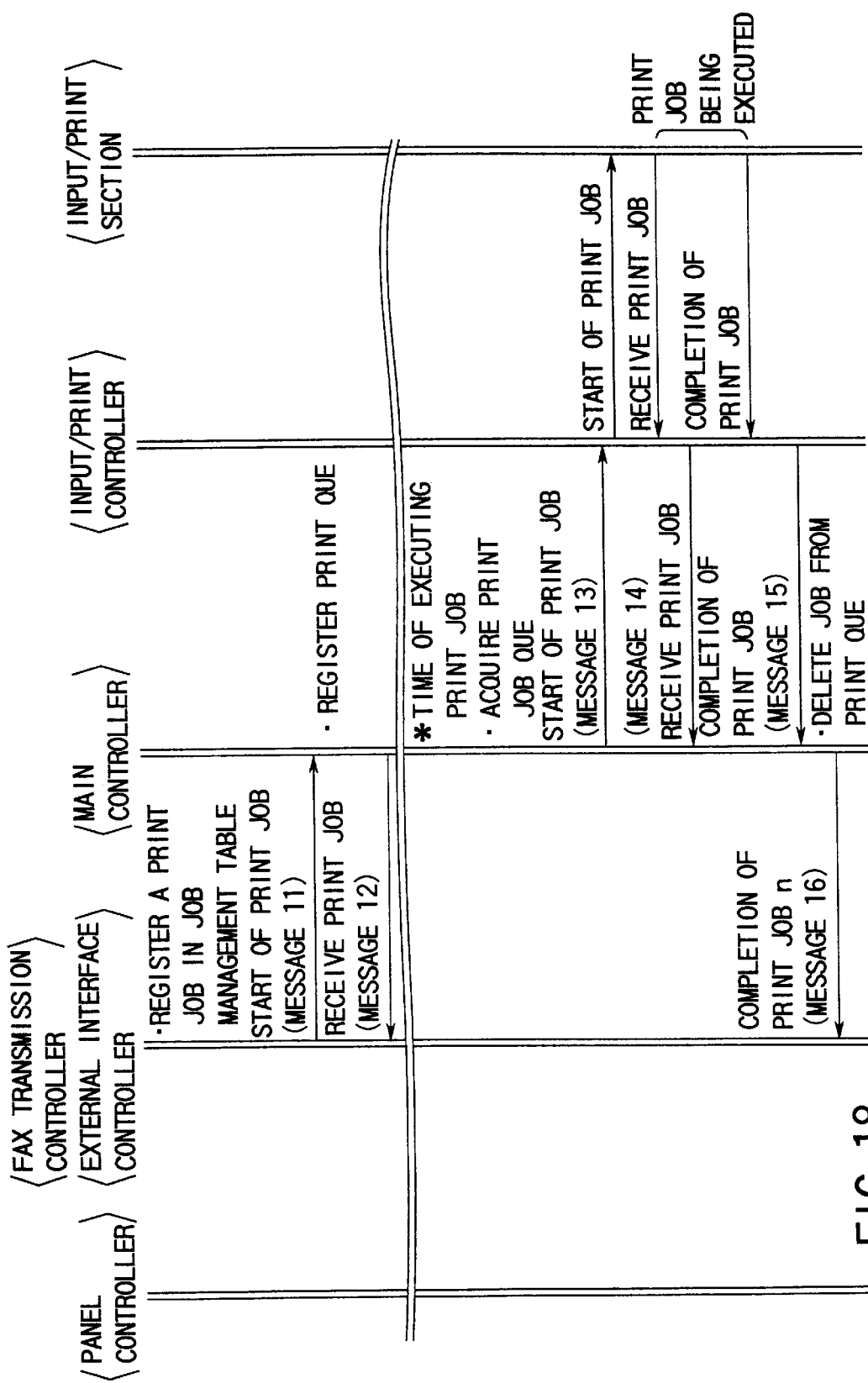
FIG. 18 is a diagram explaining how messages are exchanged among the components of the control system sections in order to execute a print job.

How massages are exchanged among the controllers 112, 114, 116, 118 and 124 and the section 120 to execute the print job will be explained with reference to FIG. 18.

Any print job generated is registered in the job management table. When the print job is so registered, a print-job start message 11 is supplied to the main controller 114 from the FAX communications controller 116 or the external interface controller 118. In response to the message 11, the main controller 114 registers the print job in the print Que table stored in the NVRAM 34.

Upon registering the print job in the print Que table, the main controller 114 supplies a print-job receipt message 12 to the FAX communications controller 116, external interface controller 118 and engine-status management section 120 which have received the print-job start message 11 from the panel controller 112. When it is determined in the time-recognizing process that the time of executing the print jot has been reached, a print job is selected among those registered in the print Que table as will be described herein later The print-job start message 13 for the print job selected is supplied from main controller 114 to the input/print controller 124.

In response to the message 13, the input/print controller 124 causes the input/print section 122 to execute the print job. When it is confirmed that resources the section 122 requires to print data are available, the input/print controller 124 supplies a print-job receipt message 14 to the main controller 114. The message 14 indicates that the input/print section 122 has received the print job.

Assume that the input/print section 122 finishes executing the print job. The input/print section 122 supplies a message to the input/print controller 124. This message indicates the completion of the print job. In response to this message, the input/print controller 124 supplies a print-job completion message 15 to the main controller 114. Upon receipt of the message 15, the main controller 114 supplies a print-job completion message 16 to the FAX communications controller 116 or the external interface controller 118.

The copying function, facsimile function and printing function of the image forming apparatus 200 will be described.

The copying function is to acquire the print data to copied and to form an image represented by the print data. The input/print section 122 acquires the print data and also forms the image on a paper sheet. More precisely, the scanner unit 50 acquires the print data, which is stored into the PM 44, and the printer unit 52 forms the image on a paper sheet.

The facsimile function is to acquire facsimile print data transmitted to the apparatus 200 and form the image represented by the facsimile print data. The facsimile print data is acquired under the control of the FAX communications controller 116. To be more specific, the FAXC 58 acquires the facsimile print data, which is stored into the file memory 68. The input/print section 122 forms the image represented by the facsimile print data. More correctly, the printer unit 52 forms the image on a paper sheet.

The printing function is to acquire the data to be printed and to form the image represented by this print data. The data is acquired under the control of the external interface controller 118. To state it more specifically, the SCSI 56 acquires the data to be printed, which is stored into the HDD 37 or the PM 44. The input/print section 122, or more correctly the printer unit 52, prints the image represented by the data.

How one print job is selected among many registered in the print Que table will be explained, with reference to FIG. 19.

Suppose the copying function, facsimile function or printing function is conducted, acquiring print data. The print data is stored in the prescribed memory. The print job of forming the image represented by this print data is registered in the print Que table.

The main controller 114 detects the time the print data is acquired by performing the copying function, facsimile function or printing function. The time detected is also registered in the print Que table. Both the print job and the time of acquiring the print data are registered in the print Que table.

The print Que table includes three print Que tables for the copying function, the facsimile function and the printing function, respectively. The print job for any data acquired by performing the copying function is registered in the print Que table for the copying function. The print job for any data acquired by performing the facsimile function is registered in the print Que table for the facsimile function. The print job for any data acquired by performing the printing function is registered in the print Que table for the printing function.

The different priorities are assigned to the three print Que tables. For example, the first priority is assigned to the print Que table for the copying function, the second priority to the print Que table for the facsimile function, and the third priority to the Que table for the printing function). Needless to say, first priority>second priority>third priority.

A print job, if registered in the print Que register for the copying function, which is assigned with the first priority, is selected and executed before any other print jobs. After this print job has been executed, the print job registered in the print Que table for the facsimile function, which is assigned with the second priority, is then selected and executed. At last, the print job registered in the print Que table for the printing function, which is assigned with the third priority, is selected and executed. These print jobs are selected in the order mentioned, by means of the main controller 114.

The information representing the print job has been acquired, which is registered in each print Que table, is utilized to select print job. Suppose a plurality of print jobs are registered in the print Que table for the copying function. If so, these print jobs will be selected in the order they have been acquired.

What should be done with any print job that cannot be executed will be explained. A print job which can not be executed is one which cannot be executed unless the password designating it is input. If registered in any print Que table, such a print job will not be selected even if a predetermined time elapses, until conditions change to allow the execution of this print job. That is, any print job that can be executed is selected before any other print job which has a lower priority.

A print job which cannot be executed may be registered in the print Que table for the printing function. In this case, an executable print job, if any in the print Que table for the facsimile function, will be selected first.

Since print jobs are managed in this way, the number of types of print jobs can easily be increased and decreased. If the memory unit provided to store the print data acquired by performing the facsimile function is full, unable to store no more data, the priority of the print Que table for the facsimile function is increased. This makes it possible to store the print data acquired by the facsimile function, into another memory unit.

Figure 19:
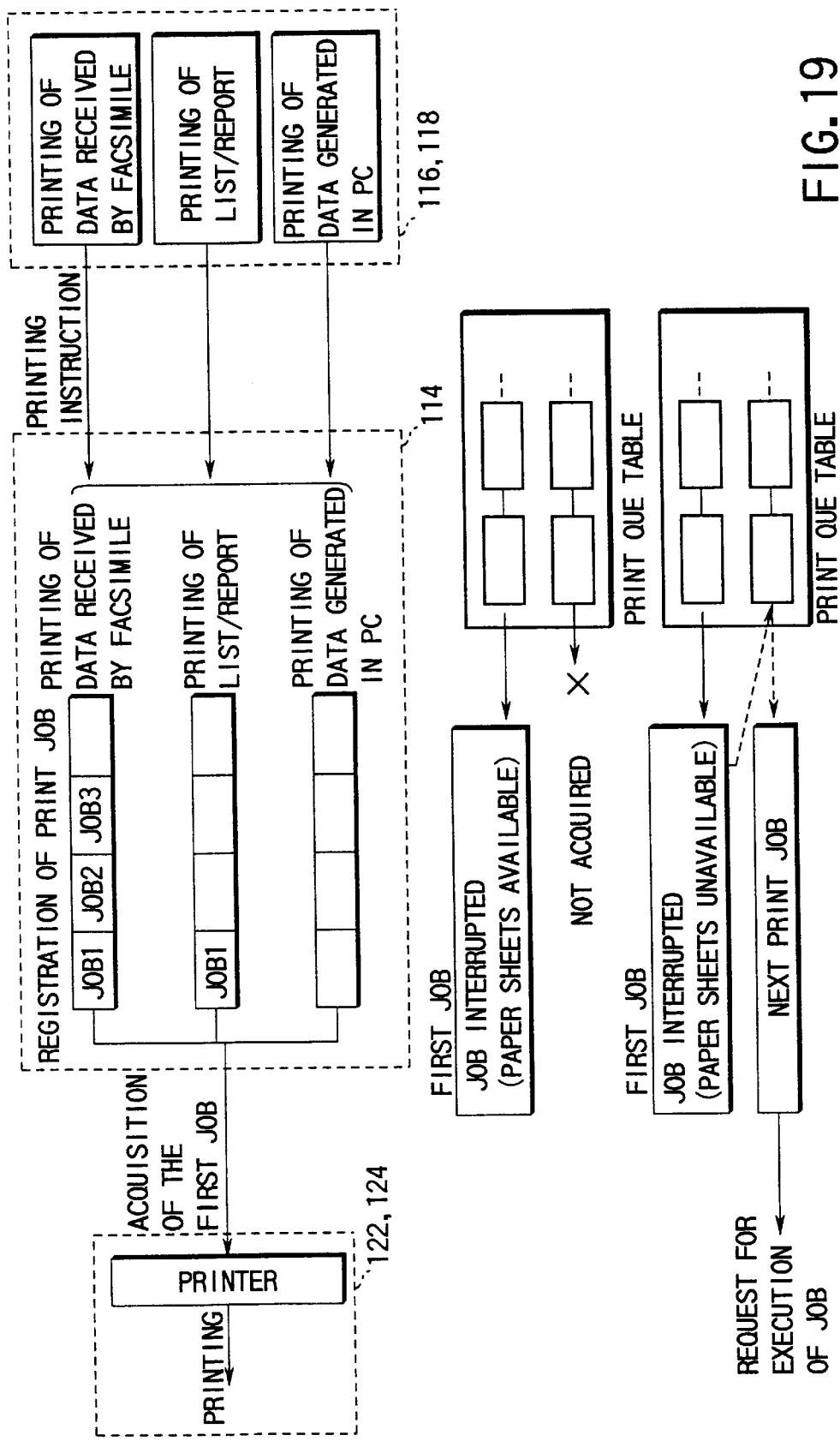
FIG. 19 is a diagram explaining how a print job is selected among many registered in a print Que table.

When the print job registered in the print Que table is interrupted as shown in the lower half of FIG. 19, the next print job is selected or not selected, depending upon the cause of the interruption. More specifically, the next print job is selected if the print job is interrupted because no paper sheets are available in the image forming apparatus 200. If the print job is interrupted for any other reason, the next print job is not selected until the cause of the interruption is removed. That is, when the print job is interrupted, the next executable print job can be executed without a delay. This helps to enhance the operating efficiency of executing print jobs.

Figure 20:
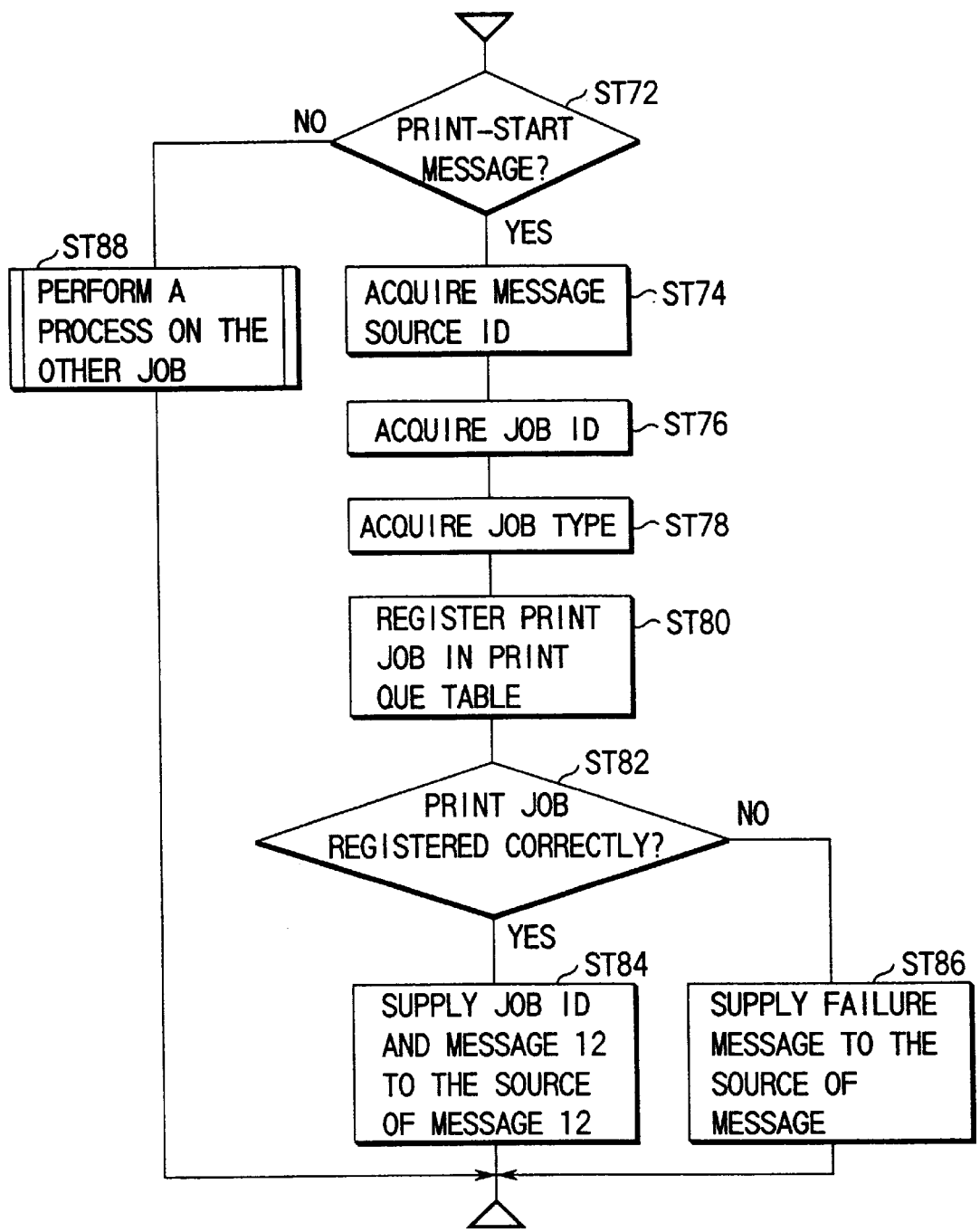
FIG. 20 is a flow chart explaining how the main controller operates when it receives a print-job start message.
Figure 21:
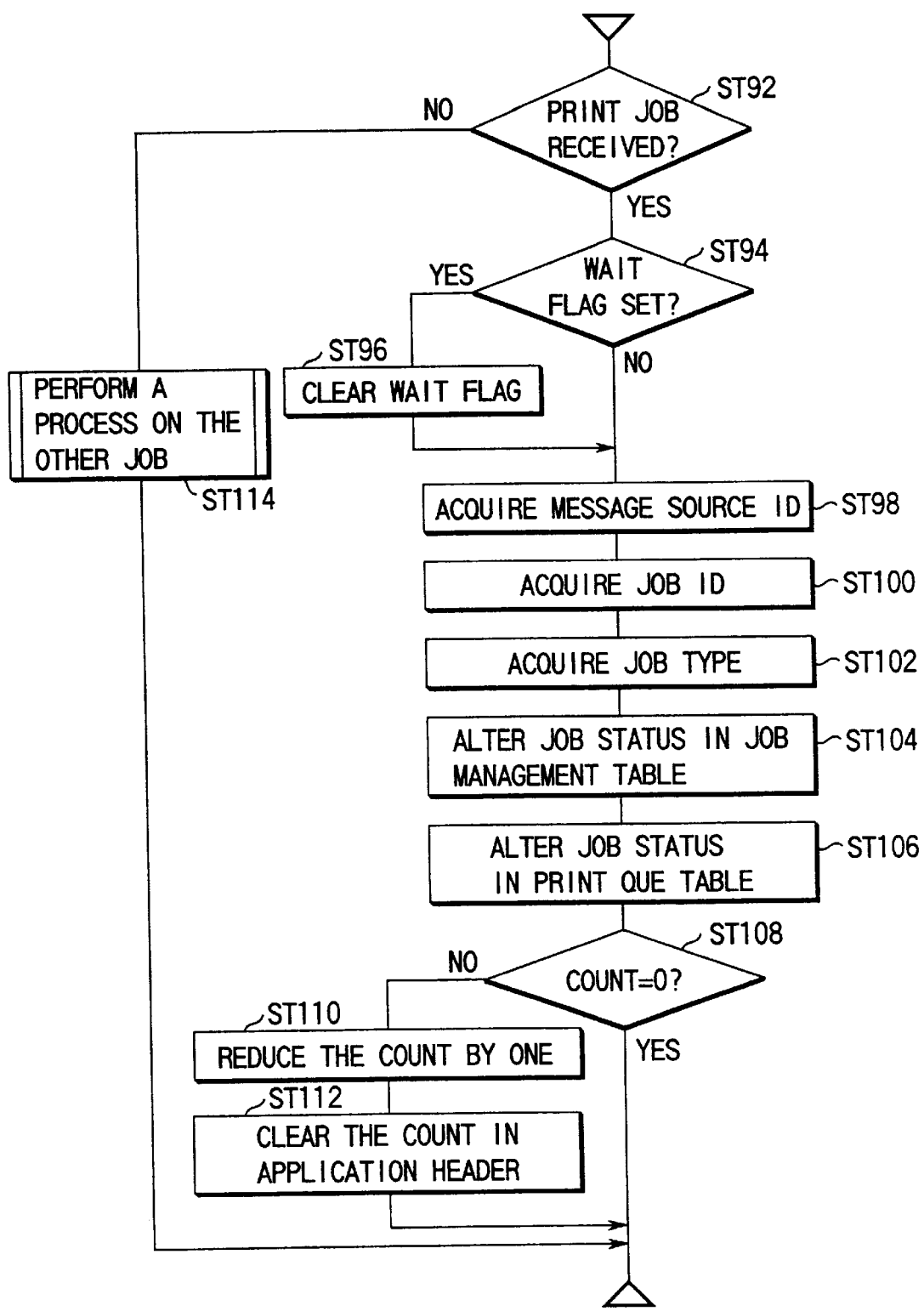
FIG. 21 is a flow chart explaining how the main controller operates when it receives a print-job receipt message.
Figure 22:
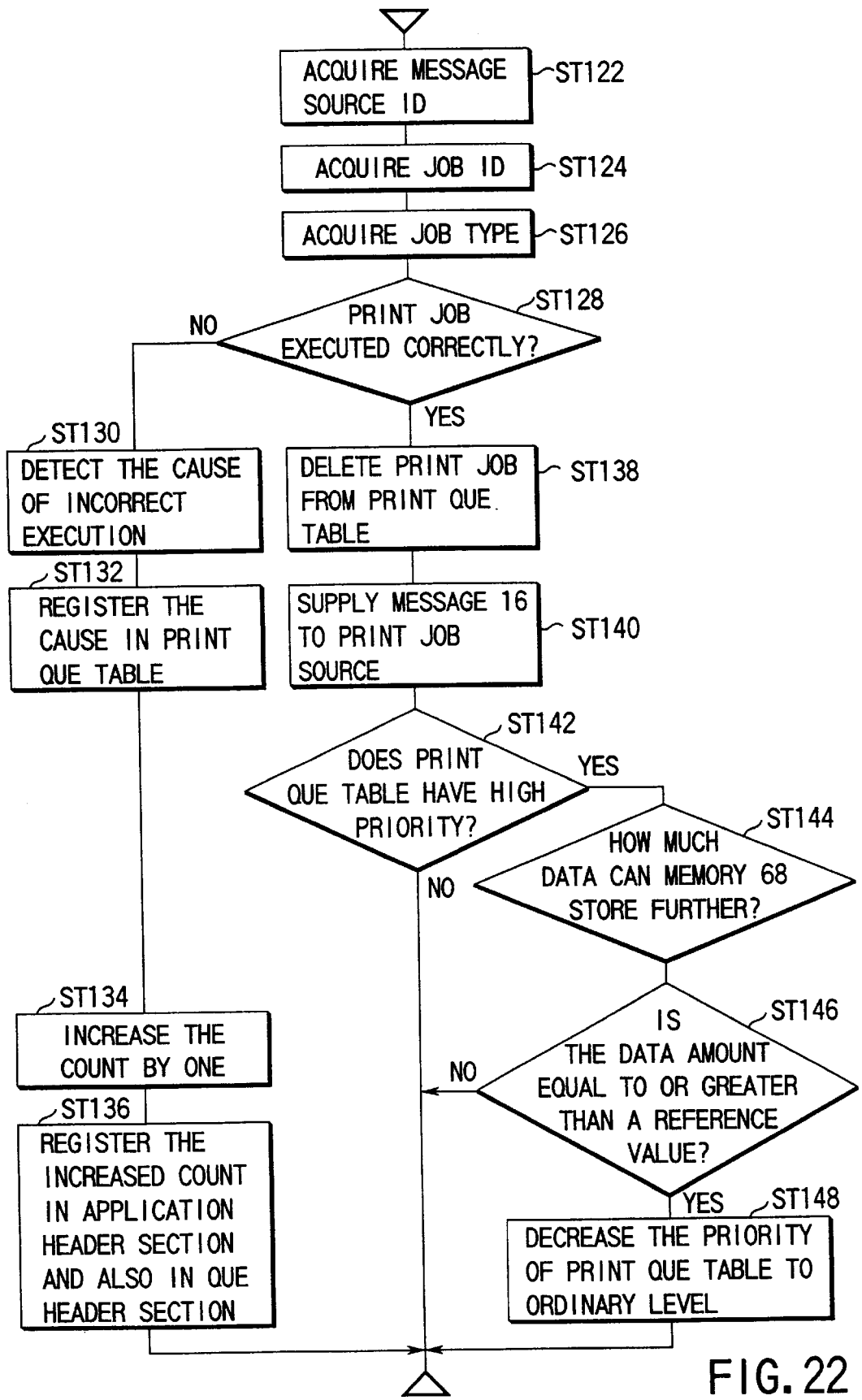
FIG. 22 is a flow chart explaining how the main controller operates when it receives a print-job completion message.

How the main controller 114 operates in response to print-related messages will be explained, with reference to FIGS. 20 to 22. FIGS. 20 to 22 illustrate a part of the job management procedure shown in FIG. 15.

FIG. 20 is a flow chart explaining how the main controller 114 operates when it receives a print-job start message 11.

First it is determined whether the message supplied to the main controller 114 is a print-job start message 11 or not (ST72). If NO in the step ST72, a job other than a print jot is executed (ST88). If YES in the step ST72, the main controller 114 acquires the message source ID (ST74), the job ID (ST76) and the data representing the job type (ST78). Further, the section 114 identifies a print job on the basis of the job ID and the job type and registers this print job in the print Que table which is shown in FIGS. 13 and 14 (ST80). Thus, a print job designated by the ordinary method and a print job identified with a password in the external interface controller 118 can have different priorities.

Then, it is determined whether or not the print job has been registered correctly (ST82). If YES in the step ST82, the job ID and the print job-receipt message 12 are supplied to the source of the print-job start message 11 (ST84). If NO in the step ST82, a failure message is supplied to the source of the message 11, indicating that the print job has not been registered in the print Que table.

FIG. 21 is a flow chart explaining how the main controller 114 operates when it receives a print-job receipt message 14.

At first it is determined whether or not the message 14 indicates the receipt of a print job (ST92). If NO in the step ST92, the controller 114 will operate to process the job which is not a print job (ST114). If YES in the step ST92, it is determined whether the wait flag is set or not (ST94).

The function of the wait flag will be explained. When the job is interrupted, the wait flat is set to delay the start of the next job. Once the wait flag is set, so-called recovery operation can be performed to, for example, replenish paper sheets in the image forming apparatus 200. Unless the wait flag is set when the job is interrupted, the next job will start the moment the job is interrupted, inevitably causing confusion on the part of the user. Assume the print job of printing data on A4-size paper sheets and the print job of printing data on B5-size paper sheets are registered in the print Que. Let us also assume that the A4-size print job has priority over the B4-size print job. When the A4-size sheets run out, the A4-size print job is interrupted. If the wait flag is not set in this event, the B5-size print job will unnecessarily as soon as the A4-size print job is interrupted.

The flow chart of FIG. 21 shall be referred to, here again. If YES in the step ST94, the wait flag is cleared (ST96). The message source ID is acquired (ST98), the job ID is acquired (ST100), and the job type is acquired (ST102). The job status registered in the job management table is altered while the print job is being executed (ST104). The job status registered in the print Que table is altered, also while the print job is being executed (ST106). It is then determined whether the count of the interruption counter is zero or not (ST108).

The interruption counter counts the number of jobs which have been interrupted. A job may be interrupted when paper sheets run out or even while the image forming apparatus 200 is operating normally. The interruption counter is provided to resume the last interrupted job when the causes of interruption are removed. This is because the user waiting at the apparatus 200 is, in most cases, the person who has designated the last interrupted job.

If a print job for the printing function, for example, is interrupted, the count of the interruption counter counts increases to 1. This count, i.e., "1," is registered in the Que header section 301 and also in the application header section 302 for the printing function. If a print job for the facsimile function, for example, is then interrupted, the count of the interruption counter counts increases to 2. This count, i.e., "2," is registered in the Que header section 301 and also in the application header section 302 for the facsimile function. When the causes of interruption of both print jobs are removed, the print job for the facsimile function is resumed first because it was interrupted after the print job for the printing function.

FIG. 21 shall be referred to, here again. If NO in the step ST108, that is, if the count of the interruption counter is not zero, the count is reduced by one (ST110). The count of the interruption counter is cleared in the application header section 302 (ST112).

FIG. 22 is a flow chart explaining how the main controller 114 section operates when it receives a print-job completion message.

First, the main controller 114 acquires the message source ID (ST122), the job ID (ST124) and the job type (ST126). It is then determined whether or not the print job has been executed correctly (ST128). If NO in the step ST128, the cause of the incorrect execution is determined and acquired (ST130). The cause of the incorrect execution is registered in the print Que table (ST132). The count of the interruption counter is increased by one (ST134). The count thus increased is registered in the application header section 302 of the print Que table and also in the Que header section 301 (ST136).

If YES in the step ST128, that is, if the print job has been executed correctly, the print job is deleted from the print Que table (ST138). The main controller 114 supplies a print-job completion message 16 to the source of the print job (ST149). It is then determined whether or not the print Que table has high priority because the file memory 68 has an inadequate storage capacity (ST142). If YES in the step ST142, how much data the file memory 68 can store further is detected (ST144). It is determined whether the amount of data, detected in the step ST114, is equal to or greater than a reference value (ST146). If YES in the step ST146, the priority of the print Que table is decreased to an ordinary level (ST148). If NO in the step ST146, a print job for the facsimile function will be executed prior to a print job for the copying function or printing function.

Figure 23:
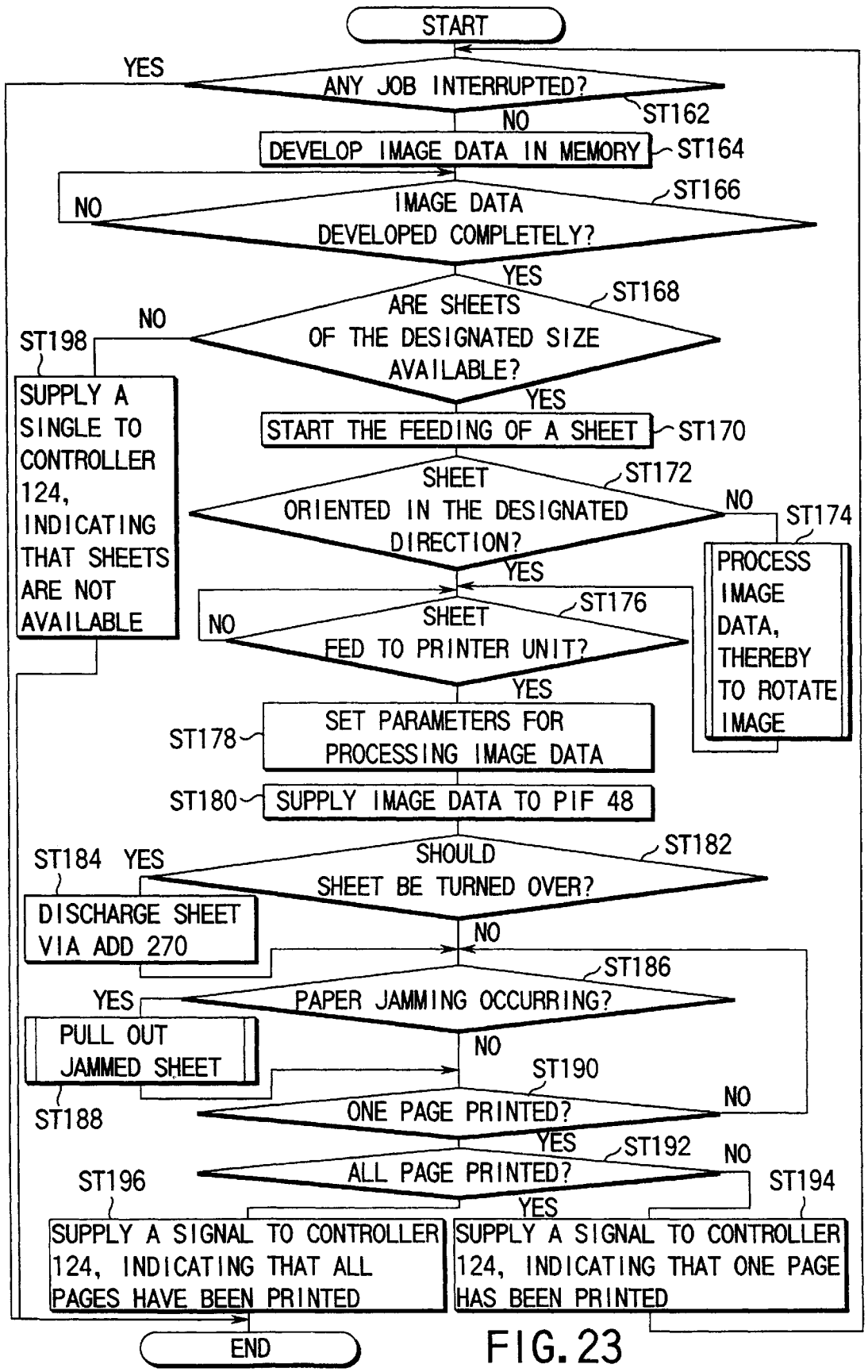
FIG. 23 is a flow chart explaining the operation of the input/print section incorporated in the image forming apparatus.
Figure 24:
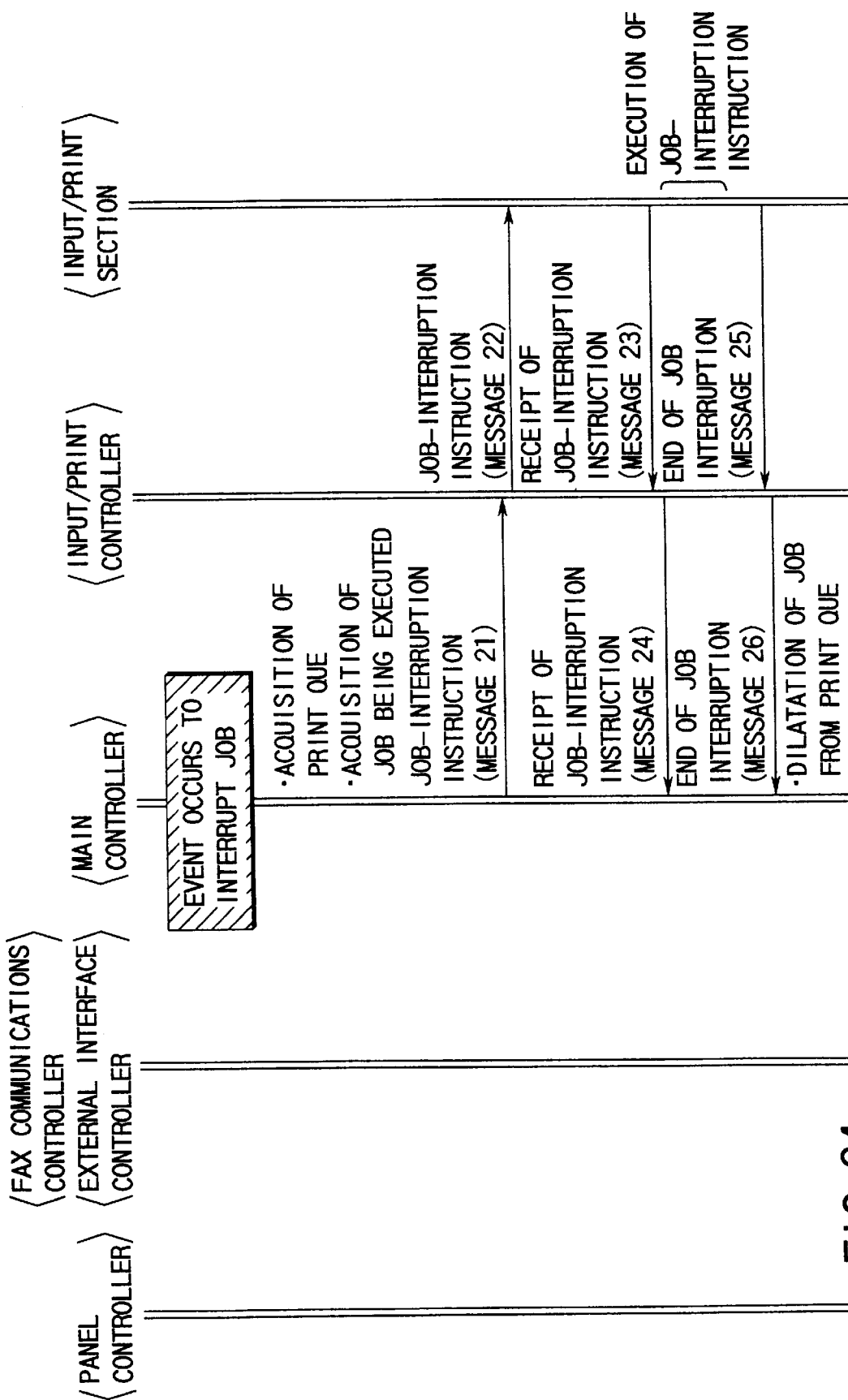
FIG. 24 is a diagram illustrating how various messages are exchanged among the components of the control system in order to interrupt a print job.

The operation of the input/print section 122 will be described with reference to the flow chart of FIG. 23.

First it is determined whether or not any job has been interrupted (ST162). If NO in the step ST162, the main controller 114 supplies a print instruction to the input/print section 12. In response to the print instruction the section 11 develops image data in an image memory (ST164). The image memory is either the I/O buffer 80 of the FAXC 58 or the QNT/PM 46. The image memory may become full before the section 12 receives all image data. If this happens, only that part of the image data which the section 122 has received is developed in the image memory.

It is determined whether or not the image data has been completely developed in the image memory (ST166). If YES in the step ST166, it is determined whether or not paper sheets of the designated size are available in the image forming apparatus 200 (ST168). If NO in the step ST168, a signal indicating this fact is supplied to the input/print controller 124 (ST198). If YES in the step ST168, the feeding of a sheet is started (ST170). It is then determined whether or not the paper sheets are oriented in the designated direction (ST172). If NO in the step ST172, the image data is processed so that the image represented by the data is rotated (ST174).

It is determined whether or not the paper sheet has been fed to the printer unit 52 (ST176). If YES in the step ST176, parameters for processing the image data are set (ST178). The parameters are those required for changing the image resolution or for smoothing the image to raise the image resolution. The image data is then supplied to the PIF 48 in synchronism with the sync signal supplied to the PIF 48 (ST180).

It is then determined whether or not the turning over of paper sheets has been designated or not (ST182). If YES in the step ST182, the paper sheet is discharged through the automatic double-siding device (ADD) 270 (ST184). Thus, the paper sheet is turned over and then discharged.

Next, it is determined whether paper jamming has occurred or not (ST186). If YES in the step ST186, the operation is interrupted and the jammed sheet is pulled out (ST188). Further it is determined whether or not one page of data has been printed (ST190). If YES in the step ST190, it is then determined whether or not all pages of data have been printed (ST192). If NO in the step ST192, a signal indicating that one page has been printed is supplied to the input/print controller 124 (ST194). If YES in the step ST192, a signal indicating that all pages have been printed is supplied to the input/print controller 124 (ST196).

Messages which are exchanged among the components of the control system (FIG. 11) to interrupt a print job.

Various events take place to interrupt a print job. A print job is interrupted when an interruption instruction is generated at the control panel 202 or when it is necessary to execute any other job before the job is executed completely. When such an event occurs, the main controller 114 supplies a message 21 to the input/print controller 124. In response to the message 21 the controller 124 supplies a job-interrupting message 22 to the input/print section 122. Upon receipt of the message 22 the section 122 supplies a message 23 to the controller 124, indicating that the section 122 has received the message 22. Upon receipt of the message 23 the controller 124 supplies a message 24 to the main controller 114, indicating that the section 122 has received the job-interrupting message 22.

When the input/print section 122 interrupts the print jot in accordance with the message 22, it supplies a message 25 to the input/print controller 124, indicating that the print job has been interrupted. Upon receipt of the message 25 the controller 124 supplies a message 26 to the main controller 114, indicating that the print job has been interrupted.

How the main controller 114 section operates when it receives messages relating to printing will be explained, with reference to FIGS. 25 and 26.

Figure 25:
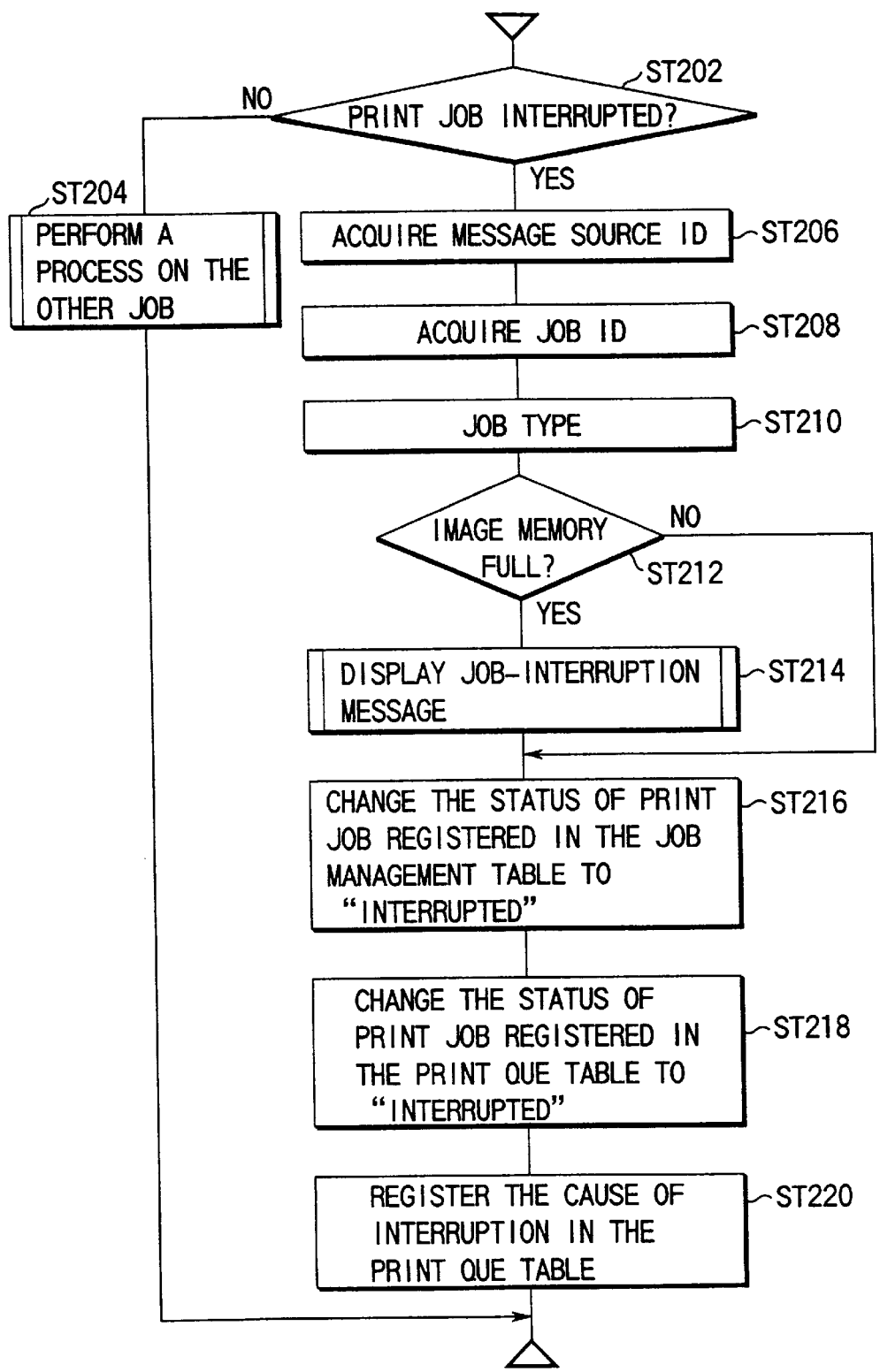
FIG. 25 is a flow chart explaining how the main controller operates when it receives a print-job interruption receipt message.

FIG. 25 is a flow chart explaining how the main controller 114 operates in response to a print-job interruption receipt message (message 24).

An event may take place to interrupt a print job. For example, a print job (front job) to be executed by the copying function may be instructed while another print job (background job) is being executed by the printing function. When such an event occurs, the main controller 114 supplies a print-job interruption instruction to the input/print controller 124.

If the status of any front job registered in the job management table changes, the type and status of the front job are determined when it is detected in the time-recognizing process that the time of executing the print jot has been reached. To interrupt the print job (the background job) being executed, the main controller 114 supplies a print-job interruption instruction to the input/print controller 124.

The image memory may become full while the print data being received by the facsimile function. In this case, the priority of the print Que table for the facsimile function is increased. As a result, the print job (the background job) is interrupted, and the print job (the front job) is executed by the facsimile function.

As shown in FIG. 25, it is determined whether or not a message has been received to instruct the interruption of any other job than a print job (ST202). If NO in the step ST202, a process is performed on the other job (ST204). If YES in the step ST202, the main controller 114 acquires the message source ID (ST206), the job ID (ST208 and the job type (ST210).

It is determined whether or not the image memory has become full while the print data being received by the facsimile function (ST212). If YES in the step ST212, the main controller 114 supplies an instruction to the panel controller 112, causing the controller 112 to display a job-interruption message (ST214). The status of the print job registered in the job management table is switched from "executed" to "interrupted" (ST216). The status of the print job registered in the print Que table is changed from "executed" to "interrupted" (ST218). Then, the cause of the interruption of the job is registered in the print Que table (ST220).

Figure 26:
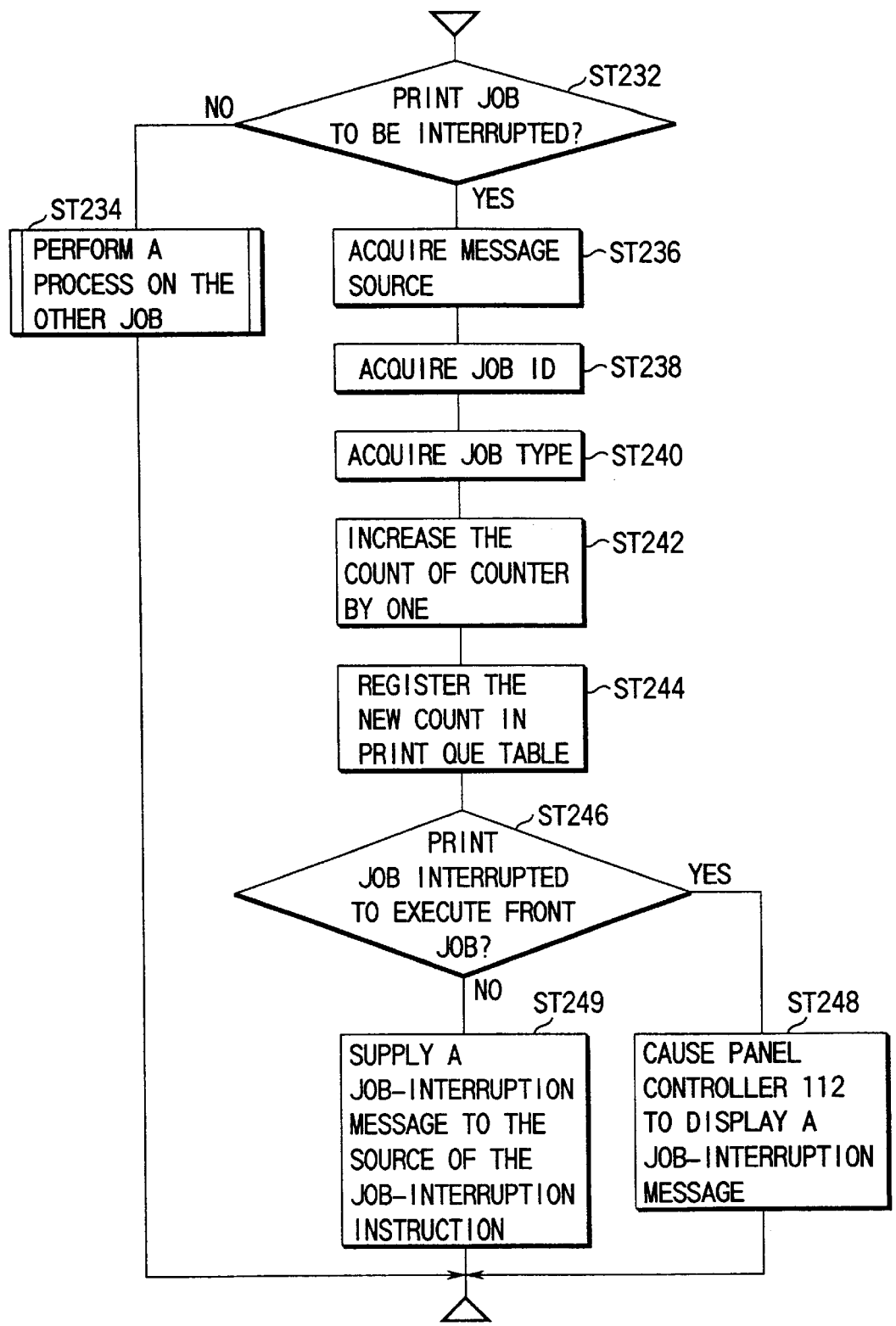
FIG. 26 is another flow chart explaining how the main controller operates when it receives a print-job interruption receipt message.

FIG. 26 is another flow chart explaining how the main controller 114 operates when it receives a print-job interruption receipt message;

First, it is determined whether or not a message has been received to instruct the interruption of any other job than a print job (ST232). If NO in the step ST232, a process is performed on the other job (ST234). If YES in the step ST232, the main controller 114 acquires the message source ID (ST236), the job ID (ST238) and the job type (ST240).

The count of the interruption counter is increased by one (ST242). The count thus increased is registered in the application header section 302 of the print Que table and also in the Que header section 301 (ST244).

It is then determined whether the print job has been interrupted because a front job should be executed (ST246). If YES in the step ST246, the main controller 114 supplies an instruction to the panel controller 112, causing the controller 112 to display a job-interruption message (ST248). If NO in the step ST246, that is, if the print job has been interrupted because a background job should be executed, the controller 114 supplies a job interruption message to the controller which has generated the print-job interruption instruction (ST249).

How the panel controller 112 operates in accordance with instructions input by operating the control panel 202 will be described, with reference to FIG. 27.

Figure 27:
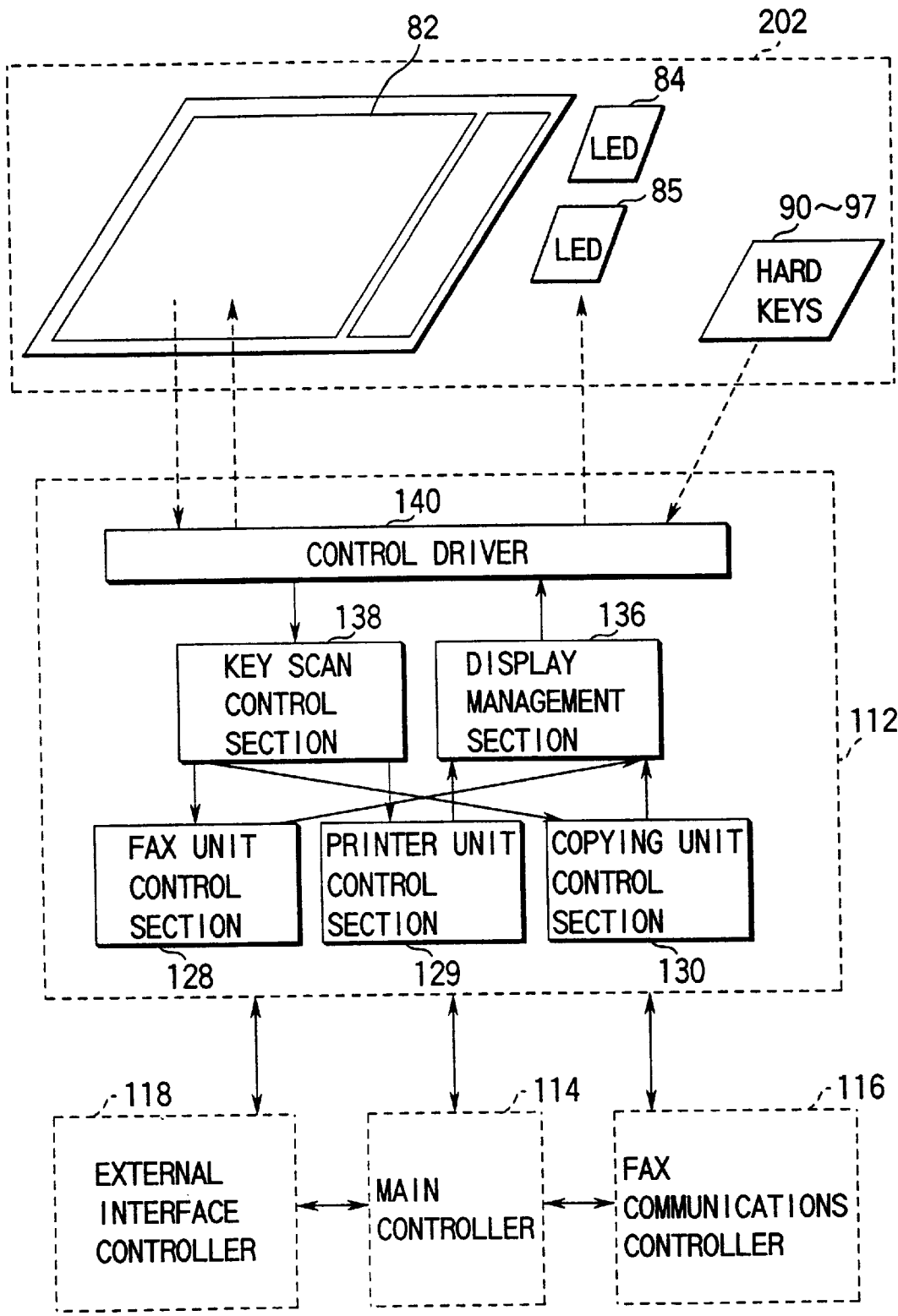
FIG. 27 is a diagram illustrating how the control panel is controlled.

As shown in FIG. 27, the panel controller 112 comprises a facsimile (FAX) unit control section 128, a printer unit control section 129, a copying unit control section 130, a display management section 136, a key scan control section 138, and a control driver 140.

The control driver 140 receives an instruction from the control panel 202 and supplies the instruction to the key scan control section 138. The section 138 receives the instruction and supplies the same to the FAX unit control section 128, printer unit control section 129 and copying unit control section 130.

The display management section 136 receives instructions from the FAX unit control section 128, printer unit control section 129 and copying unit control section 130 and supplies these instructions to the control driver 140. The control driver 140 receives the instructions from the display management section 136 and supplies them to the control panel 202.

A copying menu, a facsimile menu and a printing menu can thereby be displayed on the touch panel display 82 of the control panel 202. Also, the instructions input by operating the control panel 202 are supplied to the FAX unit control section 128, printer unit control section 129 and copying unit control section 130.

Figure 28:
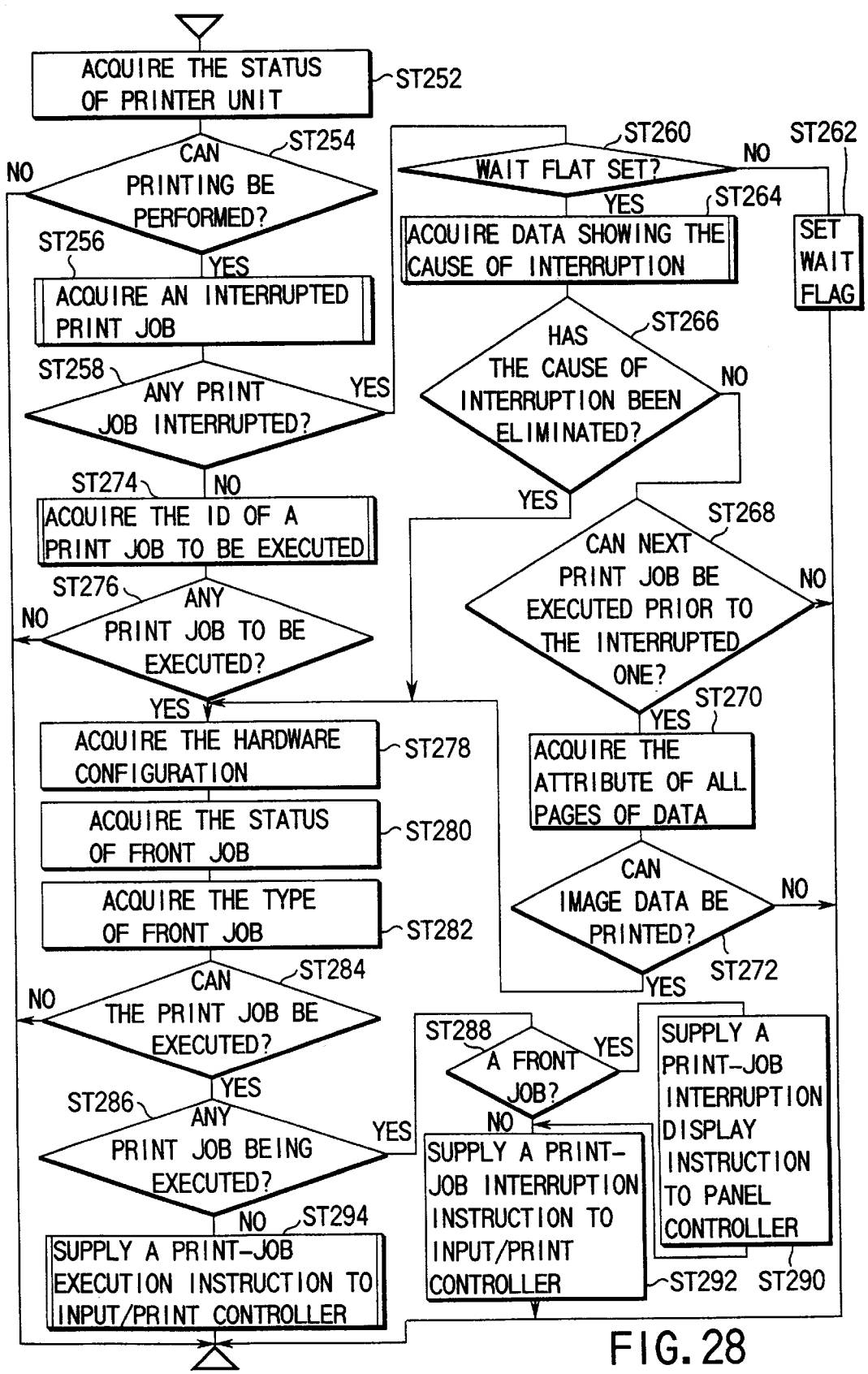
FIG. 28 is a flow chart explaining how the main controller operates to perform the printing function of the apparatus.

How the main controller 114 operates to perform the printing function of the image forming apparatus 200 will be explained, with reference to the flow chart of FIG. 28.

When a preset printing time comes, the main controller 114 acquires the status of the printer unit 52 (ST252). It is determined whether or not printing can be performed or not (ST254). More specifically, it is determined whether or not any event (e.g., paper jamming) has occurred, disabling the printer unit 52 to perform its function. If YES in the step ST254, the main controller 114 acquires from the print Que table a print job which has been interrupted (ST256), and the print job interrupted is executed prior to any other jobs.

It is then determined whether any print job is interrupted or not (ST258). If NO in the step ST258, the main controller 114 acquires the ID of a print job which should be executed (ST274). It is determined whether or not any print job needs to be executed (ST276). If NO in the step ST276, the operation comes to an end. If YES in the step ST276, the operation goes to the step ST278.

If YES in the step ST258, that is, there is an interrupted print job, it is determined whether the wait flag is set or not (ST260). If NO in the step ST260, the wait flag is set (ST262). If YES in the step ST260, the main controller 114 acquires from the print Que table the data which represents the cause of the interruption of the print job (ST264).

It is determined whether or not the cause of the interruption has been eliminated (ST266). If NO in the step ST266, it is then determined whether or not the next print job can be executed prior to the interrupted print job (ST268). If YES in the step ST268, the main controller 114 acquires the attributes of all pages of image data that are to be printed (ST270). It is determined whether the image data can be printed or not (ST272). If YES in the step ST272, the main controller 114 acquires the hardware configuration of the image forming apparatus 200 (ST278), the status of the front job (ST280), and the type of the front job (ST282). It is then determined whether or not the print job can be executed (ST284). The decision of the step ST284 is made on the basis of the criteria shown in the tables of FIGS. 29 and 30.

If YES in the step ST284, that is, if the print job can be executed, the operation goes to the step ST286. In the step ST286 it is determined whether or not any print job is being executed. If YES in the step ST 286, it is determined whether or not this print job is a front job (ST288). If YES in the step ST288, the main controller 114 gives the panel controller 112 a print-job interruption display instruction (ST290). If NO in the step ST288, that is, if the print job is a background job, the main controller 114 supplies a print-job interruption instruction to the input/print controller 124 (ST292).

If YES in the step ST284, but NO in the step ST286, the operation goes to the step ST294. In the step ST294, the main controller 114 supplies a print-job execution instruction to the input/print controller 124 (ST292). Thereafter, the operation proceeds as is illustrated in the flow chart of FIG. 23.

How to determine whether or not the print job can be executed will be described, with reference to FIGS. 29 and 30. FIG. 29 is a table for explaining how to determine whether a front print job can be executed or not. FIG. 30 are tables for explaining how to determine whether a backward print job can be executed or not.

The word "STEADY STATE" in FIG. 29 means that the image forming apparatus 200 remains unoperated longer than a predetermined period of time. More precisely, the apparatus 200 assumes the steady state if the control panel has not been operated longer than that period of time. The word "INTERRUPTED" in FIG. 29 means that a print job is interrupted in accordance with an instruction input by operating the control panel 202. The main controller 144 acquires the front-job type of the print job, the front-job status thereof and the hardware configuration of the apparatus 200. The front-job type, front-job status and the hardware configuration are compared with the criteria shown in FIG. 29, to determine whether or not the print job can be executed.

The mark "*" shown in FIG. 29 indicates that the count set in an automatic clear counter is infinitely large. The mark "Δ" means that the evaluation depends on the hardware configuration of the apparatus 200. The marks "*1," "*2" and "*3" are used in FIG. 30. The mark "*1" means that paper sheets can be used on which the data acquired by the facsimile function is to be printed. The mark "*2" means that paper sheets can be used on which the data acquired by the printing function is to be printed. The mark "*3" means that paper sheets can be used on which the data acquired by both the facsimile function and the printing function is to be printed.

Figure 31:
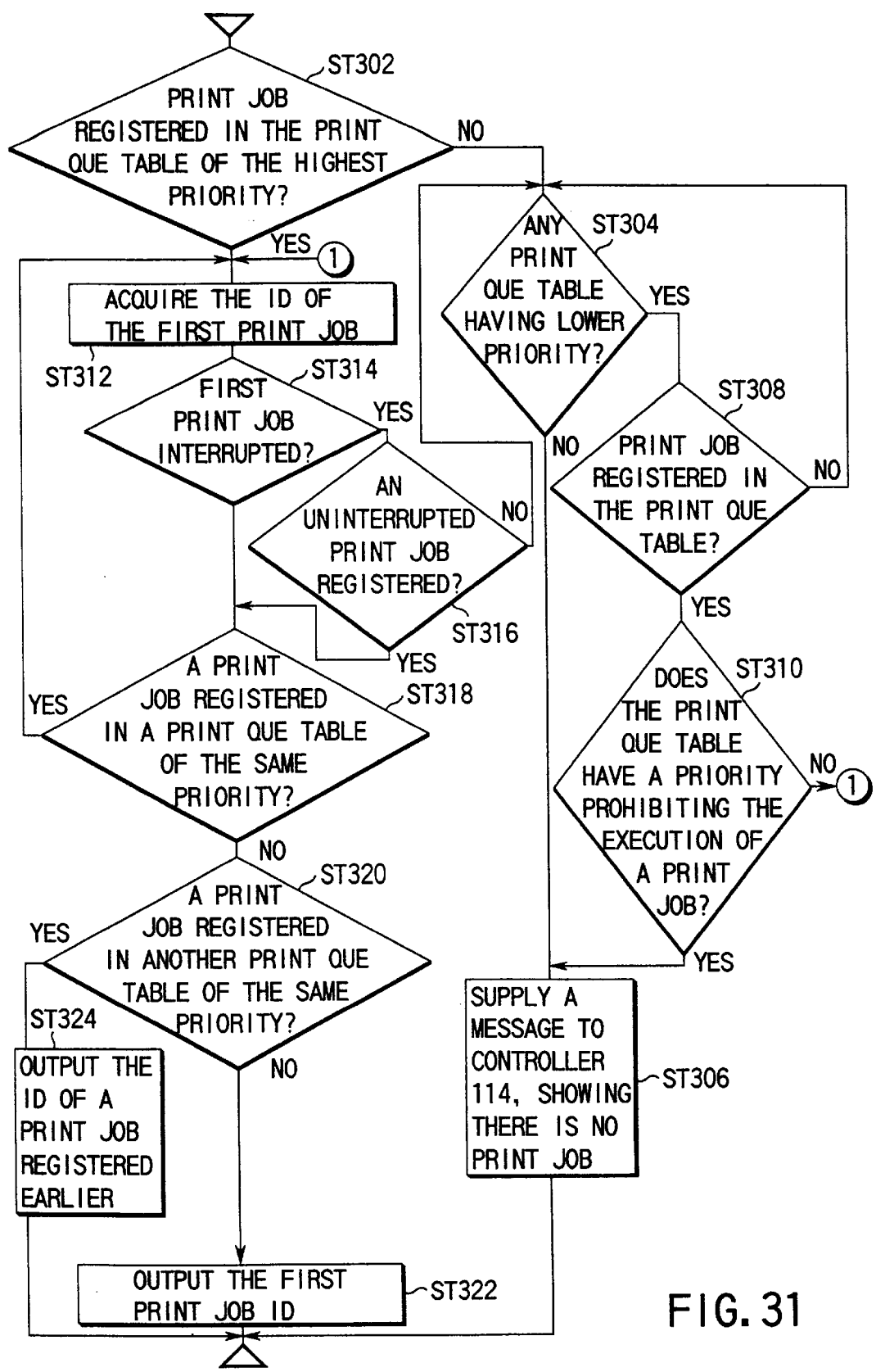
FIG. 31 is a flow chart explaining how a print jot is acquired.

How a print job is acquired will be described, with reference to the flow chart of FIG. 31.

First, it is determined whether or not a print job is registered in the print Que table which has the highest priority (ST302). If NO in the step ST302, it is determined whether or not there is a print Que table which has a lower priority (ST304). If NO in the step ST304, it is determined that no print job is registered at all. A message indicating this fact is supplied to the main controller 114 (ST306).

If YES in the step ST304, that is, if there is a print Que table of a lower priority, it is determined whether or not a print job is registered in this print Que table (ST308). If NO in the step ST308, the operation returns to the step ST304. In the step ST304 it is determined whether or not there is a print Que table of still lower priority).

If YES in the step ST308, that is, if a print job is registered in the print Que table of the lower priority, it is determined whether or not the print Que table has a priority which prohibits a print job from being executed (ST310). (The priority prohibiting the execution of a print job will be described later, with reference to FIGS. 33 and 34.) If YES in the step ST310, the operation goes to the step ST306. In the step ST306, a message indicating that no print job is registered is supplied to the main controller 114. Then, the operation goes to the step ST312.

If YES in the step ST302, that is, if a print job is registered in the print Que table of the highest priority, the first print job ID is acquired from the print Que table (ST312). It is then determined whether the first print job is interrupted or not (ST314). If YES in the step ST314, it is determined whether or not an uninterrupted print job is registered in the print Que table (ST316). If NO in the step ST316, the operation goes to the step ST304. If YES in the step ST316, it is determined whether or not a print job is registered in a print Que table of the same priority (ST318).

If NO in the step ST318, it is determined whether or not a print job is registered in another print Que table of the same priority (ST320). If NO in the step ST320, the operation goes to the step ST322, in which the first print job ID acquired in the step ST312 is output. If YES in the step ST320, the operation goes to the step ST324. In the step ST324, the ID of a print job registered earlier than the print job whose ID is output in step ST322 is acquired.

Figure 32:
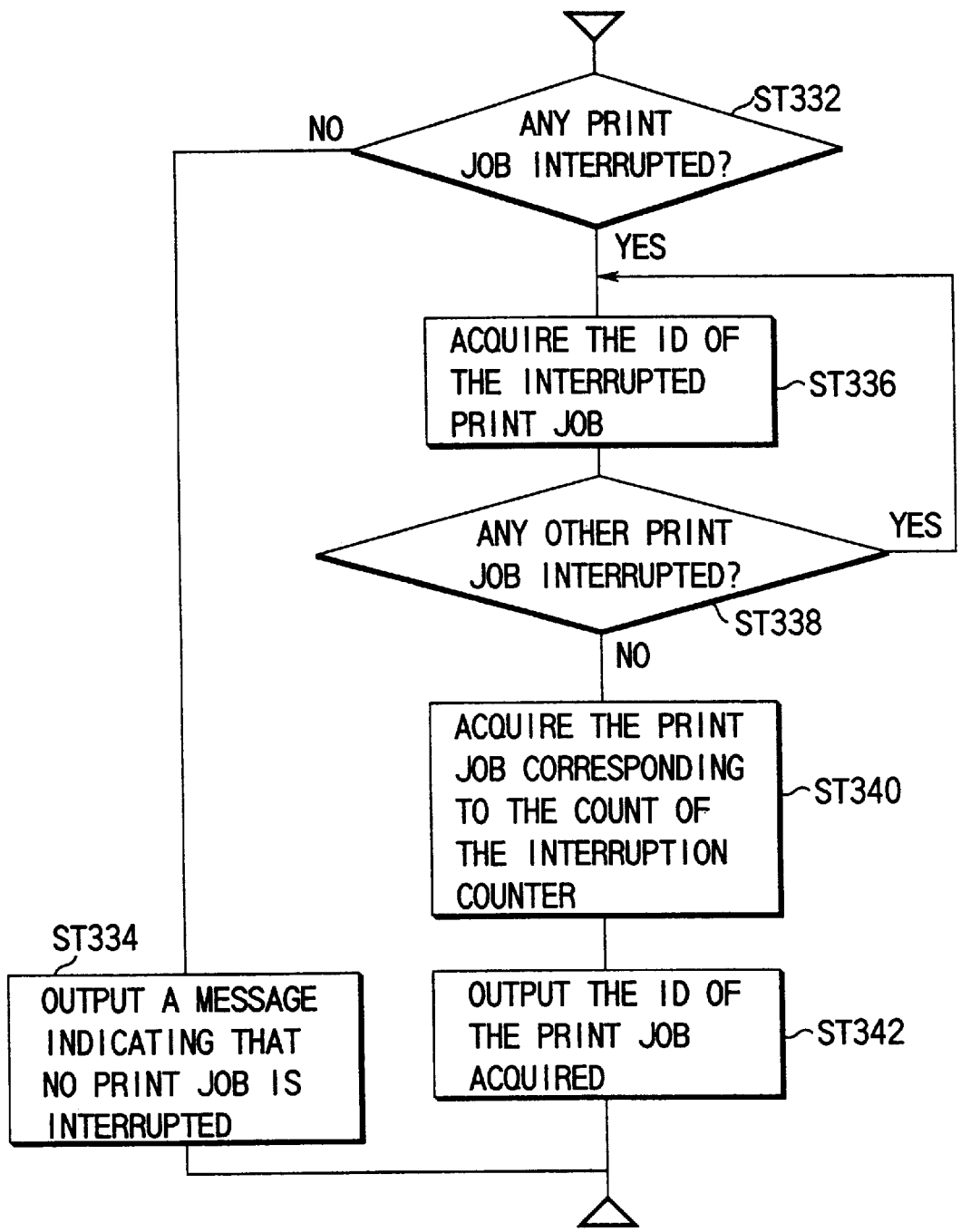
FIG. 32 is a flow chart explaining how a interrupted job is acquired.

How an interrupted print job is acquired will be explained, with reference to the flow chart of FIG. 32.

First of all, it is determined whether or not there is any interrupted print job (ST332). If NO in the step ST332, a message is output which indicates that there is no interrupted print job (ST334). If YES in the step ST332, the job ID of the interrupted print job is acquired (ST336). It is then determined whether or not any other print job is interrupted (ST338). If YES in the step ST338, the job ID of this interrupted print job is acquired (ST338).

If NO in the step ST338, that is, if there is no other interrupted print job, the operation goes to the step ST340. In the step ST340, the print job is acquired which corresponds to the count of the interruption counter provided in the application header section 302. Then, in the step ST342, the ID of the print job acquired is output from the main controller 114. As described above, the count of the interruption counter is the number of all print jobs interrupted in the application header section 302. Therefore, it identifies the print job that has been interrupted last. Hence, when the print job which corresponds to the largest count of the counter is acquired, the print job interrupted last will be execute prior to any other interrupted print job.

The priorities assigned to the print Que tables will be described with reference to FIGS. 33 and 34.

As seen from FIG. 33, ten priority levels 0 to 9 are provided. The level 9 is the highest, and the level 0 the lowest. The priority level 9 is the highest. The priority levels 1 to 7 are assigned to the user, while the priority levels 8 and 8 are used for the image forming apparatus 200 to perform a specific function. The specific function is, for example, the function of copying data at any time the user has preset. The priority level 0 is assigned to the job which is not executed in the operation represented by the flow chart of FIG. 31. The priority level 9 is assigned to the job must be executed prior to any other job.

As FIG. 34 shows, the priority level 0 is assigned to the preparation for the printing of confidential information, and the priority level 8 to the permission for the printing of confidential information. Thus, the priority level of the printing of confidential information is switched from the level 0 to the level 8 when the password input to print the confidential information is found to be genuine. The priority level 3 is assigned to the ordinary printing of the facsimile data, and the priority level 9 to the memory-full printing of the facsimile data. This means that the priority level of the printing of the facsimile data is switched from the level 3 to the level 9 when the remaining storage capacity of the memory for storing facsimile data decreased below a predetermined value.

The various actual priority levels shown in FIG. 34 have been set by the user. How the user set these priority levels will be explained later. If any actual priority level is not set, the corresponding default priority level will be adopted. The items of information which are shown in FIG. 34 are stored in, for example, the NVRAM 34.

How the priority levels are changed will be described, with reference to FIGS. 35, 36 and 37.

FIG. 35 shows a priority-changing menu displayed on the screen of the touch panel display 82. Seeing the menu, the user operates the control panel 202, thereby changing the priority levels assigned to the printing of the facsimile data received, the printing of print data, and the printing of a list. Thus, when two or more print jobs are simultaneously generated in the apparatus 200, the print job of the highest priority level (i.e., the print job which the user thinks is most important) is executed prior to any other print job.

FIG. 36 shows a password-input menu displayed on the screen of the touch panel display 82. A print job which cannot be executed unless the password assigned to it is input by operating the control panel 202. Such a print job is registered in the print Que table of the lowest priority level 0 and is prevented from being executed. It remains to be executed until the password is input. When the password is input, the priority level of the print Que table in which the print job is registered is changed to the priority level 8.

Figure 37:
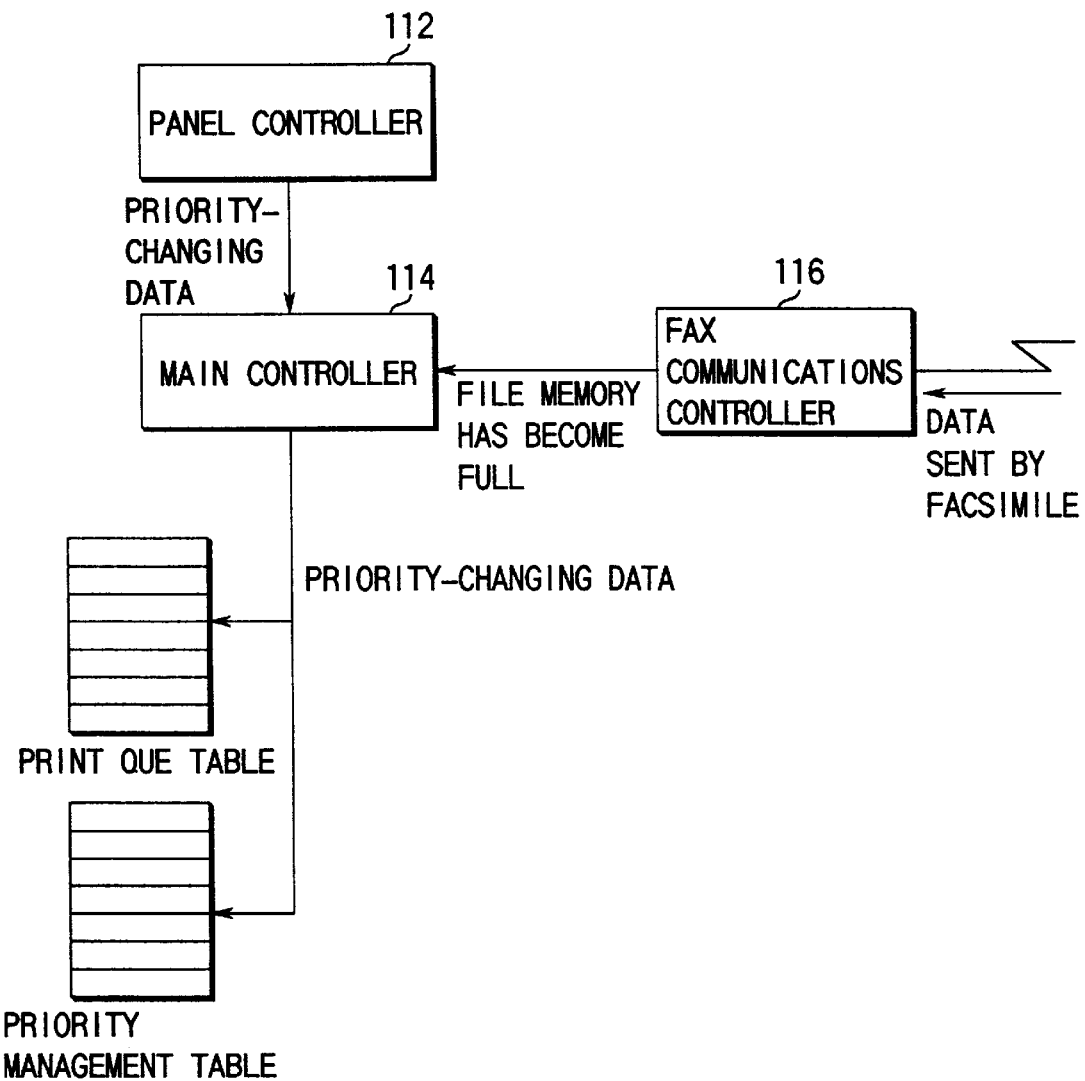
FIG. 37 is a block diagram for explaining how the priority is changed.

FIG. 37 is a block diagram for explaining how the priority is changed. Any one of the priority levels 1 to 7 assigned to the user may be changed, or a genuine password may be input to execute the print job to which the password is assigned. When this happens, the panel controller 112 supplies priority-changing data to the main controller 114. When the image memory becomes full and cannot store any more print data sent by facsimile, the FAX communications controller 116 supplies data indicating this fact to the main controller 114. The main controller 114 changes the priority level assigned to the print Que table, in accordance with the priority-changing data and the data indicating that the image memory has become full.

As has been described, the present invention can provided an image forming apparatus 200 in which the order of performing the image-forming processes be altered in accordance with the condition of the apparatus, the hardware configuration thereof and the instructions input by the user, without changing the basic rules of controlling the printing procedures.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

We claim:

1. An image forming apparatus having at least one of a copying function of forming an image represented by copy data, a facsimile function of forming an image represented by facsimile data, and a printing function of forming an image represented by print data, comprising:

first data-acquiring means for acquiring one of the copy data, the facsimile data and the print data;

second data-acquiring means for acquiring one of the copy data, the facsimile data and the print data, which is other than the data acquired by the first data-acquiring means;

means for storing the data acquire(s by said first and second data-acquiring means;

first data-registering means assigned with a first priority level, for registering a command for forming an image represented by the data acquired by said first data-acquiring means;

second data-registering means assigned with a second priority level lower that the first priority level, for registering a command for forming an image represented by the data acquired by said second data-acquiring means;

first selecting means for selecting in a predetermined order a plurality of image-forming commands registered in said first registering means and subsequently selecting in a predetermined order a plurality of image-forming commands registered in said second registering means, in cases where a plurality of image-forming commands are registered in both said first and second registering means;

second selecting means for skipping image-forming commands impossible to implement when the plurality of image-forming commands registered in said first registering means are selected in a predetermined order by said first selecting means, and subsequently selecting in a predetermined order the plurality of image-forming commands registered in said second registering means; and image-forming means for executing an image-forming job in accordance with the image-forming commands possible to implement and selected from said first and second selecting means.

2. An apparatus according to claim 1, further comprising control means for causing said forming means to execute an image-forming job, when the image-forming job is interrupted while being executed in accordance with a predetermined image-forming command, and a cause of interruption is eliminated.

3. An apparatus according to claim 1, further comprising control means for causing said image-forming means to execute a second image-forming job prior to a first image-forming job, when the first image-forming job is interrupted while being executed in accordance with a first image-forming command, the second image-forming job is interrupted while being executed in accordance with a second image-forming command, and a cause of interruption of both image-forming jobs is eliminated.

* * * * *